US011655312B2

(12) United States Patent
Brothers et al.

(10) Patent No.: US 11,655,312 B2
(45) Date of Patent: May 23, 2023

(54) AQUEOUS POLYMERIZATION OF PERFLUOROMONOMER USING HYDROCARBON SURFACTANT

(71) Applicant: THE CHEMOURS COMPANY FC, LLC, Wilmington, DE (US)

(72) Inventors: Paul Douglas Brothers, Chadds Ford, PA (US); Subhash Vishnu Gangal, Hockessin, DE (US); Dipti Dilip Khasnis, Wilmington, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 410 days.

(21) Appl. No.: 16/888,938

(22) Filed: Jun. 1, 2020

(65) Prior Publication Data

US 2020/0291141 A1 Sep. 17, 2020

Related U.S. Application Data

(62) Division of application No. 15/342,189, filed on Nov. 3, 2016, now Pat. No. 10,703,829, which is a division of application No. 14/992,421, filed on Jan. 11, 2016, now Pat. No. 9,518,170, which is a division of application No. 13/292,356, filed on Nov. 9, 2011, now Pat. No. 9,255,164.

(60) Provisional application No. 61/498,806, filed on Jun. 20, 2011, provisional application No. 61/411,622, filed on Nov. 9, 2010.

(51) Int. Cl.
*C08F 2/16* (2006.01)
*C08F 14/26* (2006.01)
*C09D 127/18* (2006.01)
*C08F 14/18* (2006.01)
*C08K 5/41* (2006.01)

(52) U.S. Cl.
CPC ............... *C08F 2/16* (2013.01); *C08F 14/18* (2013.01); *C08F 14/26* (2013.01); *C08K 5/41* (2013.01); *C09D 127/18* (2013.01)

(58) Field of Classification Search
CPC . C08F 2/16; C08F 14/26; C08F 14/18; C08K 5/41; C09D 127/18
See application file for complete search history.

(56) References Cited

U.S. PATENT DOCUMENTS

| | | |
|---|---|---|
| 2,559,752 A | 7/1951 | Berry |
| 3,009,892 A | 11/1961 | Duddington et al. |
| 3,037,953 A | 6/1962 | Marks et al. |
| 3,271,341 A | 9/1966 | Garrison |
| 3,282,875 A | 11/1966 | Connolly et al. |
| 3,391,099 A | 7/1968 | Punderson |
| 3,859,262 A | 1/1975 | Hartwimmer |
| 4,036,802 A | 7/1977 | Poirier |
| 4,098,978 A | 7/1978 | Mikofalvy et al. |
| 4,342,675 A | 8/1982 | Gangal |
| 4,358,545 A | 11/1982 | Ezzell et al. |
| 4,463,144 A | 7/1984 | Kojima et al. |
| 4,469,846 A | 9/1984 | Khan et al. |
| 4,552,631 A | 11/1985 | Bissot et al. |
| 4,940,525 A | 7/1990 | Ezzell et al. |
| 5,530,078 A | 6/1996 | Felix et al. |
| 5,637,748 A | 6/1997 | Hong et al. |
| 5,925,705 A | 7/1999 | Araki et al. |
| 5,959,026 A | 9/1999 | Abusleme et al. |
| 6,177,196 B1 | 1/2001 | Brothers et al. |
| 6,300,445 B1 | 10/2001 | Hong et al. |
| 6,365,684 B1 | 4/2002 | McCarthy et al. |
| 6,512,063 B2 | 1/2003 | Tang |
| 6,833,414 B2 | 12/2004 | Granel et al. |
| 6,841,616 B2 | 1/2005 | Wille et al. |
| 6,869,997 B2 | 3/2005 | Wille et al. |
| 7,064,170 B2 | 6/2006 | Kaspar et al. |
| 7,074,862 B2 | 7/2006 | Kaspar et al. |
| 7,122,610 B2 | 10/2006 | Wille et al. |
| 7,220,483 B2 | 5/2007 | Coates et al. |
| 7,521,513 B2 | 4/2009 | Tang |
| 7,566,762 B2 | 7/2009 | Otsuka et al. |
| 7,705,074 B2 | 4/2010 | Brothers et al. |
| 7,728,087 B2 | 6/2010 | Hintzer et al. |
| 7,763,680 B2 | 7/2010 | Aten et al. |
| 7,897,682 B2 | 3/2011 | Brothers et al. |

(Continued)

FOREIGN PATENT DOCUMENTS

| | | |
|---|---|---|
| CA | 878571 A | 8/1971 |
| EP | 1 533 325 A1 | 5/2005 |

(Continued)

OTHER PUBLICATIONS

Kasai et al, J Appl Polymer Sci, 57, 797 (1995).
Silberberg, M.S., Chemistry, the Molecular Nature Ofmatter and Change, 5 Ed., Published By McGraw-Hill Higher Education (2009), Periodic Table on Back of Front Cover.
Ebnesajjad, S., Fluoroplastics, vol. 2 Melt Processable Fluoropolymers, Plastic Design Library (2003), p. 27.

(Continued)

*Primary Examiner* — Patrick D Niland

(57) ABSTRACT

A process is provided for the polymerization of fluoromonomer to an dispersion of fluoropolymer particles in an aqueous medium in a polymerization reactor, by (a) providing the aqueous medium in the reactor, (b) adding the fluoromonomer to the reactor, (c) adding initiator to the aqueous medium, the combination of steps (b) and (c) being carried out essentially free of hydrocarbon-containing surfactant and resulting in the kickoff of the polymerization of the fluoromonomer, and (d) metering hydrocarbon-containing surfactant into the aqueous medium after the kickoff of polymerization, e.g. after the concentration of the fluoropolymer in the aqueous medium is at least 0.6 wt %, the metering being at a rate reducing the telogenic activity of said surfactant while maintaining surface activity.

26 Claims, No Drawings

(56) References Cited

U.S. PATENT DOCUMENTS

| | | |
|---|---|---|
| 7,977,438 B2 | 7/2011 | Brothers et al. |
| 8,080,621 B2 | 12/2011 | Amin-Sanayei et al. |
| 9,255,164 B2 | 2/2016 | Brothers et al. |
| 9,371,405 B2 | 6/2016 | Brothers et al. |
| 9,518,170 B2 | 12/2016 | Brothers et al. |
| 2002/0040119 A1 | 4/2002 | Tang |
| 2005/0014879 A1 | 1/2005 | Moroishi et al. |
| 2005/0090613 A1 | 4/2005 | Maruya et al. |
| 2005/0222313 A1 | 10/2005 | Tomihashi et al. |
| 2006/0128872 A1 | 6/2006 | Zipplies et al. |
| 2006/0173121 A1 | 8/2006 | Tamai |
| 2006/0178472 A1 | 8/2006 | Johnson |
| 2006/0281845 A1 | 12/2006 | Amin-Sanayei et al. |
| 2006/0281946 A1 | 12/2006 | Morita et al. |
| 2007/0015864 A1 | 1/2007 | Hintzer et al. |
| 2007/0015865 A1 | 1/2007 | Hintzer et al. |
| 2007/0015866 A1 | 1/2007 | Hintzer et al. |
| 2007/0032591 A1 | 2/2007 | Durali et al. |
| 2007/0082993 A1 | 4/2007 | Amin-Sanayei et al. |
| 2007/0135546 A1 | 6/2007 | Amin-Sanayei et al. |
| 2007/0149733 A1 | 6/2007 | Otsuka et al. |
| 2007/0270534 A1 | 11/2007 | Amin-Sanayei et al. |
| 2007/0282044 A1 | 12/2007 | Cavanaugh et al. |
| 2008/0114121 A1 | 5/2008 | Brothers et al. |
| 2008/0114143 A1 | 5/2008 | Brothers et al. |
| 2008/0125558 A1 | 5/2008 | Tang |
| 2008/0146757 A1 | 6/2008 | Lyons |
| 2008/0262177 A1 | 10/2008 | Lyons |
| 2009/0221776 A1 | 9/2009 | Durali et al. |
| 2010/0160490 A1 | 6/2010 | Leffew et al. |
| 2010/0213131 A1 | 8/2010 | Linford et al. |
| 2012/0116003 A1 | 5/2012 | Brothers et al. |
| 2017/0073435 A1 | 3/2017 | Brothers et al. |

FOREIGN PATENT DOCUMENTS

| | | |
|---|---|---|
| GB | 1299520 A | 12/1972 |
| JP | 2004-359870 A | 12/2004 |
| WO | 2007046345 A1 | 4/2007 |
| WO | 2007046377 A1 | 4/2007 |
| WO | 2007046482 A1 | 4/2007 |
| WO | 2007049517 A1 | 5/2007 |
| WO | 2008019155 A1 | 2/2008 |
| WO | 2008066839 A1 | 6/2008 |
| WO | 2009013214 A1 | 1/2009 |
| WO | 2009126504 A2 | 10/2009 |
| WO | 2011024856 A1 | 3/2011 |
| WO | 2011024857 A1 | 3/2011 |

OTHER PUBLICATIONS

Emulsion Polymerization of Acrylic Monomers, May 1966, Published By Rohm and Haas Company, Philadelphia, PA.

High Polymer Chemistry ($2^{nd}$ Edition), Jun. 30, 1997, p. 26, Zu-Ren Pan Chemical Industry Press.

AQUEOUS POLYMERIZATION OF PERFLUOROMONOMER USING HYDROCARBON SURFACTANT

FIELD OF THE INVENTION

This invention relates to the use of hydrocarbon surfactant as the stabilizing surfactant in the aqueous dispersion polymerization of fluoromonomer.

BACKGROUND OF THE INVENTION

In the interest in replacing ammonium perfluorooctanoate as the stabilizing surfactant in the polymerization of certain fluoromonomers, notably $VF_2$, recent patents disclose the use of hydrocarbon surfactants for this purpose. For example, U.S. Pat. No. 7,122,610 (Wille et al.) demonstrates the use of certain alkane-sulfonates, sulfones, and disulfones in the polymerization to form non-elastomeric fluoropolymers containing at least 71 wt % vinylidene fluoride ($VF_2$). Such polymers are known to be low melting, i.e. polyvinylidene fluoride (PVDF) has a melting temperature of 155-192° C. (p. 27 of S. Ebnesajjad, Fluoroplastics, Vol. 2 melt Processible Fluoropolymers, Plastics Design Library (2003)). U.S. Pat. No. 7,521,513 (Tang) demonstrates the use of sodium octyl sulfonate in the polymerization to form $VF_2$/HFP fluoroelastomer, wherein the low molecular weight of the fluoroelastomer is indicated by its inherent viscosity being determined by the Mooney Viscometer method, wherein the fluoroelastomer is flowable at 121° C. so that its resistance to shear can be measured at this temperature. U.S. Pat. No. 3,391,099 (Punderson) demonstrates in Example VI the use of sodium lauryl sulfate in the polymerization of TFE and a small amount of HFP to form a sinterable modified PTFE. Example VI also uses 260 ppm of fluorinated surfactant, AFC (ammonium ω-hydrohexadecafluoronanoate), so this polymerization is not fluorosurfactant-free.

There is a need for greatly reducing or entirely eliminating fluorosurfactant in the aqueous dispersion polymerization of fluoromonomer to form fluoropolymers, e.g. the non-melt-processible perfluoroplastics such as, polytetrafluoroethylene (PTFE) and the melt-fabricable perfluoroplastics such as tetrafluoroethylene/hexafluoropropylene copolymer (FEP) and tetrafluoroethylene/perfluoro(alkyl vinyl ether)(PFA).

SUMMARY OF THE INVENTION

The present invention satisfies this need by the process for polymerizing fluoromonomer to form a dispersion of fluoropolymer particles in an aqueous medium in a polymerization reactor, comprising (a) providing the aqueous medium in the reactor, (b) adding the fluoromonomer to the reactor, (c) adding polymerization initiator to the aqueous medium, thereby kicking off the polymerizing of the fluoromonomer, and (d) metering hydrocarbon-containing surfactant into the aqueous medium after the kickoff of the polymerization, wherein the aqueous medium is essentially free of surfactant before the kicking off of the polymerizing of the fluoromonomer and no halogen-containing surfactant is added to the aqueous medium during or after the kicking off of the polymerization. With respect to steps (b) and (c), the addition of initiator and fluoromonomer in these steps may be conducted in reverse order, but the stepwise sequence of (b) and then (c) is preferred. This is Process 1. All the preferences disclosed hereinafter can be used in the practice of Process 1.

Preferably, the metering (d) is at a rate reducing the telogenic activity of the hydrocarbon-containing surfactant while maintaining surface activity to stabilize the dispersion of fluoropolymer particles in the medium during the polymerizing. Preferably, the metering of the hydrocarbon-containing surfactant into the aqueous medium is commenced when the concentration of fluoropolymer as particles in the aqueous medium is at least 0.6 wt %. The polymerization of the fluoromonomer is continued to completion after the kickoff and during the metering of step (d), optionally with the step of adding more initiator to the aqueous medium, if necessary for the continuation of the polymerization.

This polymerization process can be practiced with all its preferences described above and hereinafter also preferably additionally provides polymerization sites dispersed in the aqueous medium prior to the kickoff of the polymerizing of the fluoromonomer.

The polymerization process of the present invention may alternatively be described as Process 2. Processes 1 and 2 are the same invention, but described differently. Process 2 can be described as follows:

A process for polymerizing fluoromonomer to form a dispersion of fluoropolymer particles in an aqueous medium in a polymerization reactor, comprising an initial period and a stabilization period, wherein the initial period comprises preparing an initial dispersion of fluoropolymer particles in an aqueous medium in the polymerization reactor and the stabilization period comprises polymerizing fluoromonomer in the polymerization reactor, and:

adding hydrocarbon-containing surfactant to the polymerization reactor, wherein during the stabilization period no fluorosurfactant is added. The initial period of the polymerization process preferably includes the providing of polymerization sites prior to kicking off of the polymerization reaction as described for Process 1. In the stabilization period, adding hydrocarbon-containing surfactant is preferably accomplished by metering of the hydrocarbon-containing surfactant into the aqueous medium as in Process 1. The result of the polymerizing of the fluoromonomer in the stabilization period forms the dispersion of fluoropolymer particles resulting from the polymerization process. The stabilization period is the period during which the fluoropolymer particles of the initial dispersion of fluoropolymer particles grow in size by precipitation of the polymerizing fluoromonomer to form the larger, final particles of the final dispersion of fluoropolymer particles.

Some of the preferences for Process 2 include the following, individually and in combination:

Preferably, the initial dispersion of fluoropolymer particles is essentially free of fluorosurfactant.

Preferably, during the stabilization period no halogen-containing surfactant is added.

In one embodiment of the invention, the preparing of an initial dispersion of fluoropolymer particles comprises adding to the polymerization reactor:
(a) aqueous medium,
(b) water-soluble hydrocarbon-containing compound,
(c) degradation agent,
(d) fluoromonomer, and
(e) polymerization initiator, wherein the degradation agent is added prior to the polymerization initiator. This embodiment of the invention operates to provide polymerization sites prior to kicking off of the polymerization reaction as described for Process 1. Preferably, the water-soluble hydrocarbon-containing compound is added in an amount of 50 ppm or less than 50 ppm. Preferably, degradation agent is added in an amount sufficient to obtain an aqueous medium essentially free of the water-soluble hydrocarbon-containing compound. Preferably, the water-soluble hydrocarbon-containing compound is selected from cationic surfactants, nonionic surfactants, and anionic surfactants. Preferably, the water-soluble hydrocarbon-containing compound is ethoxy-containing surfactant. Preferably, the polymerization reactor is essentially free of water-soluble hydrocarbon-containing compound in the initial period after the preparation of the initial dispersion. Preferably, the degradation agent is a compound which is the same as or different from the polymerization initiator.

Preferably, polymerization of the fluoromonomer in the reactor causes polymerization kick-off and the polymerization reactor is essentially free of water-soluble hydrocarbon-containing compound at the kick-off.

Preferably, the hydrocarbon-containing surfactant is metered into the polymerization reactor during the stabilization period, preferably at a rate sufficient to reduce the telogenic activity of the hydrocarbon-containing surfactant.

Preferably, the adding of the hydrocarbon-containing surfactant commences when the concentration of the fluoropolymer particles in the aqueous medium is at least 0.6 wt %.

Preferably, the hydrocarbon-containing surfactant is anionic.

Preferably, the hydrocarbon-containing surfactant is hydrocarbon surfactant.

Preferably, the hydrocarbon-containing surfactant is a compound of the formula R-L-M wherein R is an alkyl group containing from 6 to 17 carbon atoms, L is selected from the group consisting of —ArSO$_3^-$, —SO$_3^-$, —SO$_4$—, —PO$_3^-$ and —COO$^-$, wherein Ar is an aryl group, and M is a univalent cation, preferably selected from H$^+$, Na$^+$, K$^+$ and NH$_4^+$.

Preferably, the polymerizing is carried out in the presence of polymerization initiator.

Preferably, the process further comprises passivating the hydrocarbon-containing surfactant, preferably by reacting the hydrocarbon-containing surfactant with an oxidizing agent. Preferred oxidizing agents are hydrogen peroxide or polymerization initiator. Preferably, the passivation of the hydrocarbon-containing surfactant is carried out in the presence of a passivation adjuvant, preferably a metal in the form of metal ion. Preferred metals have multiple positive valences. Most preferred passivation adjuvants are ferrous ion or cuprous ion. Preferred embodiments of the invention passivate the hydrocarbon-containing surfactant prior to, during, or after the addition to the polymerization reactor.

Preferred fluoromonomers are selected from tetrafluoroethylene (TFE), hexafluoropropylene (HFP), perfluoro-2,2-dimethyl-1,3-dioxole (PDD), perfluoro-2-methylene-4-methyl-1,3-dioxolane (PMD), perfluoro(alkyl vinyl ether) (PAVE) and mixtures thereof, preferably tetrafluoroethylene (TFE).

In a preferred process during the stabilization period, the amount of the hydrocarbon-containing surfactant added into the reactor is effective to provide the dispersion of fluoropolymer particles having a solids content of 45 wt % or greater than 45 wt %. Preferably, to achieve this solids content, the amount of the hydrocarbon-containing surfactant added into the reactor is 3000 ppm or greater than 3000 ppm based on the weight of the fluoropolymer particles.

Preferably, the fluoropolymer particles are fluoroplastic, preferably perfluoroplastic.

In accordance with another embodiment of the invention, preparing the initial dispersion of fluoropolymer particles in the aqueous medium in the polymerization reactor is carried out by adding a previously-prepared fluoropolymer dispersion to the aqueous medium. Additional embodiments of the invention include a fluoropolymer dispersion obtainable by the process according to any one of the preceding claims and a fluoropolymer resin obtainable by isolation from the fluoropolymer dispersion. Preferably, the fluoropolymer dispersion and/or resin is selected from the group consisting of PTFE, and melt-fabricable copolymer comprising 40-98 wt % tetrafluoroethylene units and 1-60 wt % of at least one other monomer and wherein the melt-fabricable copolymer is preferably a copolymer containing greater than 75 wt % perhalomonomer, preferably tetrafluoroethylene.

These preferences listed above for Process 2 can also be used individually or in any combination in the practice of Process 1. The disclosure hereinafter applies to Processes 1 and 2 and variations thereof.

The hydrocarbon-containing surfactant metered into the aqueous polymerization medium (Process 1) and added to the reactor (Process 2) is the stabilizing surfactant for the dispersion of fluoropolymer, fluoroplastic, or perfluoroplastic, particles formed during the polymerization. In addition to the C—H bonds present in the hydrocarbon-containing surfactant, the carbon atoms of the surfactant can be substituted with other elements, notably halogen such as chlorine or fluorine. Preferably, the monovalent substituents, as elements of the Periodic Table, on the carbon atoms of the surfactant are at least 75% substituted with hydrogen, more preferably at least 85% and even more preferably, at least 95%. Most preferred, the hydrocarbon-containing surfactant is hydrocarbon surfactant, which means that the carbon atoms present in the surfactant that could be substituted by monovalent atoms such as halogen, such as fluorine or chlorine, are instead substituted by hydrogen, whereby the hydrocarbon surfactant is free of such halogens as fluorine and chlorine. Accordingly, in hydrocarbon surfactant, 100% of the monovalent substituents, as elements from the Periodic Table, on the carbon atoms of the surfactant are hydrogen.

The telogenic activity of the hydrocarbon-containing surfactant, or simply its telogenicity, is primarily the result of reaction between the hydrocarbon-containing surfactant and radicals in the polymerization system. In effect, the result of telogenicity is inhibition of the polymerization reaction. There are many pathways which manifest telogenicity, but regardless of the pathway, telogenic behavior is the behavior which leads to a reduced number of growing polymer chains and thereby a reduced rate of polymer production and/or a significant reduction in polymer molecular weight.

The aqueous medium being essentially free of surfactant prior to kicking off of the polymerization reaction (Process 1) and during the initial period after preparation of the initial dispersion of fluoropolymer particles (preferred form of Process 2 in which the polymerization reactor is essentially free of water-soluble hydrocarbon-containing compound) includes the essential freedom when the surfactant is hydrocarbon-containing surfactant, such as hydrocarbon surfactant, and halogen-containing surfactant such as fluorosurfactants. Thus, in accordance with this aspect of the invention, the aqueous medium is also essentially free of C—H bonds present in the hydrocarbon moiety of any of the surfactants or hydrocarbon-containing compound, particularly the hydrocarbon-containing surfactants. The aqueous polymerization medium being essentially free of the hydrocarbon-containing surfactant means that any amount of such surfactant that is present in the aqueous medium at the time of polymerization kickoff will not detrimentally inhibit the polymerization reaction, neither its kickoff nor the polymerization reaction occurring after kickoff. Thus, the delayed addition of the hydrocarbon-containing surfactant after polymerization kickoff described in Process 1 and the addition of this surfactant in the stabilization period described in Process 2 is the first addition of a stabilizing amount of surfactant for the dispersion of fluoropolymer, including fluoroplastic, particles growing during the polymerization reaction in the stabilization period.

While the hydrocarbon-containing surfactant contains C—H bonds, it can also contain other monovalent substituents on the carbon atoms, such as halogen atoms such as chlorine or fluorine, thereby becoming halogen-containing surfactants. When the predominant halogen substituent is fluorine, the resultant surfactant will be referred to as fluorosurfactant Typically, in the halogen-containing surfactants, the carbon atoms of the surfactant that are substituted with monovalent elements are primarily substituted, e.g. at least 70%, with such halogen atoms, most often fluorine. With the presence of halogen atoms in such surfactant, it may be desirable to undertake a process for removing or recovering or disposal of the surfactant from the aqueous polymerization medium after completion of the polymerization to satisfy cost and environmental concerns. One reason for minimizing halogen-containing surfactant from the aqueous medium is to save removal (from the aqueous medium) and recovery cost. Even then, complete removal or disposal is very expensive, Preferably, therefore, the aqueous polymerization medium is also essentially free of halogen-containing surfactant. This applies to the aqueous medium prior to kickoff as described in Process 1, whereby the aqueous medium is essentially free of all surfactant, and to the initial period of the polymerization as described in Process 2. Thus, if any halogen-containing surfactant, including fluorosurfactant, is present in the aqueous medium within the reactor before polymerization kick off, such amount is insufficient to form the stabilizing function of the dispersion of fluoropolymer, including fluoroplastic, particles formed after such kick off and in the stabilization period described in Process 2. Refraining from adding any halogen-containing surfactant to the aqueous medium in the reactor either prior to, during or after polymerization kickoff described in Process 1 and during both the initial period and the stabilization period described in Process 2 is most preferred, eliminating the need for removal and recovery.

The present invention as a variation of Process 1 can also be described as a process for polymerizing fluoromonomer to form a dispersion of fluoropolymer, preferably fluoroplastic, more preferably perfluoroplastic, particles in an aqueous medium in a polymerization reactor, comprising kicking off the polymerizing of the fluoromonomer by adding polymerization initiator to the aqueous medium, the medium being essentially free of surfactant at the time of the kicking off, and metering hydrocarbon-containing surfactant, preferably hydrocarbon surfactant, into the aqueous medium after the kickoff of the polymerization, the metering being at a rate reducing the telogenic activity of the hydrocarbon-containing surfactant while maintaining surface activity to stabilize the dispersion of fluoropolymer particles in the medium during the polymerizing. The polymerization of the fluoromonomer can be continued to completion after the kickoff and during the metering of the hydrocarbon-containing surfactant into the aqueous medium, optionally with the step of adding more initiator to the aqueous medium, if necessary for the continuation of the polymerization. Preferably, no halogen-containing surfactant is present in or added to the aqueous medium at any time during the polymerization reaction in this variation of Process 1 and in Processes 1 and 2. The preferences disclosed hereinafter also apply to this embodiment of the polymerization process.

A preferred embodiment of the process of the present invention is the additional step of passivating the hydrocarbon-containing surfactant, preferably hydrocarbon surfactant, that is used in step (d) of Process 1 and in the stabilization period of Process 2. Passivation of the stabilizing surfactant reduces the telogenicity of the surfactant so as to reduce the time of polymerization to a given solids content after kickoff. The passivating is preferably carried out by oxidizing the surfactant such as by reacting it with an oxidizing agent preferably in the presence of a passivation adjuvant as will be described hereinafter.

With respect to the preferred additional step of providing polymerization sites dispersed in the aqueous medium prior to the kickoff of the polymerizing of the fluoromonomer in Process 1, this additional step is also preferably included in the practice of the initial period described in Process 2. These polymerization sites serve as nucleation sites for the precipitation of fluoropolymer, fluoroplastic, or perfluoroplastic, as the case may be, onto thereby growing dispersed particles during polymerization, resulting in the fluoropolymer particles in the final dispersion of fluoropolymer particles being smaller in size than if such polymerization sites were not present. The polymerization sites can come from a variety of sources. For example, they can come from fluorine-containing polymer, such as made by seed polymerization in the presence of surfactant to obtain the fluorine-containing polymer as dispersed particles in the aqueous medium in which they are formed. Such surfactant can be a halogen-containing surfactant such as fluorosurfactant, wherein the monovalent substituents on carbon atoms of the surfactant are primarily fluorine. Only a small amount of halogen-containing surfactant is necessary to maintain this dispersion, compared to the amount of hydrocarbon-containing surfactant used to stabilize the dispersion of fluoropolymer particles resulting from the polymerization step. This reduces the amount of halogen-containing surfactant for removal or recovery, if desired, from the aqueous medium.

Alternatively, the dispersion of polymerization sites can be hydrocarbon-containing sites, preferably hydrocarbon sites. The combination of hydrocarbon stabilizing surfactant and hydrocarbon polymerization sites provides a polymerization system that is free of halogen-containing surfactant, eliminating any need for halogen-containing surfactant.

Another surprising result of the present invention is the capability of the polymerization process, Process 1 or Process 2, preferably including preferred embodiments, to achieve a very high solids content of dispersed fluoropolymer particles. Preferably, solids contents of are 45 wt % and greater than 45 wt %. The process therefore provides for such high solids dispersions, especially PTFE dispersions, which are stabilized by hydrocarbon-containing surfactant, and which are obtained directly by polymerization as disclosed in Example 10, not requiring a separate concentration step.

DETAILED DESCRIPTION OF THE INVENTION

Fluoromonomer/Fluoropolymer

The fluoromonomers are the monomers that polymerize or copolymerize to produce fluoropolymers, preferably fluoroplastics. Fluoropolymers, including fluoroplastics, preferably contain at least 35 wt % fluorine, based on the total weight of the polymer. The disclosure hereinafter is applied primarily to the polymerization to make fluoropolymers, but this disclosure is also applicable to making fluoroplastics, as well. When hydrogen is present in the fluoropolymer, the amount of hydrogen is preferably 5 wt % or less, based on the total weight of the fluoropolymer. The preferred fluoroplastics are perfluoroplastics, which are polymers in which the monovalent substituents on the carbon atoms forming the chain or backbone of the polymer are fluorine atoms, with the exception of comonomer, end groups, or pendant groups from the polymer backbone. Preferably, the comonomer, end group, or pendant group structure will impart no more than a total of 2 wt % C—H moiety, more preferably no greater than 1 wt % of C—H moiety, with respect to the total weight of the perfluoroplastic. Preferably, the hydrogen content, if any, of the perfluoroplastic is no greater than 0.2 wt %, based on the total weight of the perfluoroplastic. The perfluoroplastics are obtained from polymerizing perfluoromonomer.

The preferred fluoropolymers are the fluoropolymers that most often exhibit a melting temperature and possess crystallinity such that they are not fluoroelastomers. Such fluoropolymers typically having crystallinity and melt temperature characteristics are referred to as fluoroplastics, including perfluoroplastics. Preferred fluoroplastics and perfluoroplastics have sufficient crystallinity that they have a heat of fusion by differential scanning calorimetry (DSC) of at least 9 J/gm as determined according to ASTM D-4591 or, if amorphous, such as TFE/PDD copolymer, have a glass transition temperature of 50° C. or greater. Additional distinction from fluoroelastomers is that the preferred fluoroplastics and perfluoroplastics do not exhibit the fluoroelastomer characteristic of glass transition temperature below 25° C. In addition, fluoroplastics and perfluoroplastics do not possess the combination of low flex modulus, high elongation, and after crosslinking, rapid recovery from deformation. One significance of this fact is that fluoroplastics made by the present invention include very high molecular weight polymers such as polytetrafluoroethylene (PTFE), much higher than that of fluoroelastomers, which obtain their strength from being crosslinked. Such PTFE has a molecular weight (Mn) of at least 1,000,000, usually well in excess of that amount, e.g. at least 2,000,000, as compared to much lower molecular weights of fluoroelastomers (uncrosslinked). Fluoroelastomers have a Mn that is a small fraction of the PTFE Mn and gain their dimensional integrity by crosslinking, whereby it is satisfactory if the polymerization process makes a lower molecular weight polymer, i.e. the presence of telogenic activity in the aqueous polymerization medium is more tolerable to make fluoroelastomer than fluoroplastic. The use of hydrocarbon-containing surfactants, including hydrocarbon surfactants, in the process of the present invention would be expected to prevent the high molecular weights of fluoroplastics from being obtained. Notwithstanding this expectation, high molecular weight fluoroplastics, notably PTFE, are obtained by the process of the present invention.

In greater detail, the preferred fluoromonomer used in the process of this invention is preferably perfluoromonomer independently selected from the group consisting of tetrafluoroethylene (TFE), hexafluoropropylene (HFP), perfluoro-2,2-dimethyl-1,3-dioxole (PDD), perfluoro-2-methylene-4-methyl-1,3-dioxolane (PMD), perfluoro(vinyl ether) and perfluoro(butenyl vinyl ether) and mixtures thereof. Preferred perfluoro(vinyl ethers) include perfluoro (alkyl vinyl ether) monomers (PAVE), wherein the alkyl group contains 1 to 5 carbon atoms, such as perfluoro(propyl vinyl ether) (PPVE), perfluoro(ethyl vinyl ether) (PEVE), and perfluoro(methyl vinyl ether) (PMVE) and mixtures thereof.

Perfluorovinyl ethers also include those useful for introducing functionality into fluoropolymers, preferably fluoroplastics, most preferably perfluoroplastics. These include $CF_2=CF—(O—CF_2CFR_f)_a—O—CF_2CFR'_fSO_2F$, wherein $R_f$ and $R'_f$ are independently selected from F or a perfluorinated alkyl group having 1 to 10 carbon atoms, a=0, 1 or 2. Polymers of this type are disclosed in U.S. Pat. No. 3,282,875 ($CF_2=CF—O—CF_2CF(CF_3)—O—CF_2CF_2SO_2F$, perfluoro(3,6-dioxa-4-methyl-7-octenesulfonyl fluoride)), and in U.S. Pat. Nos. 4,358,545 and 4,940,525 ($CF_2=CF—O—CF_2CF_2SO_2F$). Another example is $CF_2=CF—O—CF_2—CF(CF_3)—O—CF_2CF_2CO_2CH_3$, methyl ester of perfluoro (4,7-dioxa-5-methyl-8-nonenecarboxylic acid), disclosed in U.S. Pat. No. 4,552,631. Similar fluorovinyl ethers with functionality of nitrile, cyanate, carbamate, and phosphonic acid are disclosed in U.S. Pat. Nos. 5,637,748; 6,300,445; and 6,177,196.

The invention is especially useful for polymerizing when producing polytetrafluoroethylene (PTFE) perfluoroplastic including modified PTFE to produce dispersions thereof in an aqueous medium. Polytetrafluoroethylene (PTFE) refers to (a) the polymerized tetrafluoroethylene by itself without any significant comonomer present, i.e. homopolymer, and (b) modified PTFE, which is a copolymer of TFE with such small concentrations of comonomer that the melting point of the resultant polymer is not substantially reduced below that of PTFE. The modified PTFE contains a small amount of comonomer modifier which reduces crystallinity to improve processing, examples of such monomers being such as perfluoroolefin, notably hexafluoropropylene (HFP) or perfluoro(butyl) ethylene, and perfluoro(alkyl vinyl ether) (PAVE), where the alkyl group contains 1 to 5 carbon atoms, with perfluoro(ethyl vinyl ether) (PEVE) and perfluoro (propyl vinyl ether) (PPVE) being preferred. The concentration of such comonomer is preferably less than 1 wt %, more preferably less than 0.5 wt %, based on the total weight of the TFE and comonomer present in the PTFE. A minimum amount of at least about 0.05 wt % is preferably used to have significant effect. PTFE (and modified PTFE) typically has a melt creep viscosity of at least about $1 \times 10^6$ Pa·s and preferably at least $1 \times 10^8$ Pa·s and, with such high melt viscosity, the polymer does not flow in the molten state and therefore is not a melt-processible polymer (fluoroplastic). The measurement of melt creep viscosity is disclosed in col. 4 of U.S. Pat. No. 7,763,680. The high melt viscosity of PTFE arises from its extremely high molecular weight (Mn), e.g. at least $10^6$. PTFE can also be characterized by its high melting temperature, of at least 330° C. ($1^{st}$ heating), usually at least 331° C. and most often of at least 332° C. (all $1^{st}$ heat). The non-melt flowability of the PTFE, arising from its extremely high melt viscosity, manifests itself as a no melt flow condition when melt flow rate (MFR) is measured in accordance with ASTM D 1238 at 372° C. and using a 5 kg. weight. This no melt flow condition is an MFR of 0. The high melt viscosity of the PTFE reduces the ability of the molten PTFE to reform the "as polymerized" crystal structure upon cooling from the first heating. As a result, this high melt viscosity leads to a much lower heat of fusion obtained for the second heat (e.g. up to 55 J/g) as compared to the first heat (e.g. at least 75 J/g) to melt the PTFE, representing a heat of fusion difference of at least 20 J/g. The high melt viscosity of PTFE enables its standard specific gravity (SSG) to be measured as a characterization of extremely high molecular weight. The SSG measurement procedure (ASTM D 4895, also described in U.S. Pat. No. 4,036,802) includes sintering of the SSG sample free standing (without containment) above its melting temperature without change in dimension of the SSG sample. The SSG sample does not flow during the sintering.

The process of the present invention is also useful in polymerizing low molecular weight PTFE perfluoroplastic, which is commonly known as PTFE micropowder, so as to distinguish from the PTFE described above. The molecular weight of PTFE micropowder is low relative to PTFE, i.e. the molecular weight (Mn) of the PTFE micropowder is generally in the range of $10^4$ to $10^5$. The result of this lower molecular weight of PTFE micropowder is that it has fluidity in the molten state, in contrast to PTFE which is not melt flowable. PTFE has melt flowability, which can be characterized by a melt flow rate (MFR) of at least 0.01 g/10 min, preferably at least 0.1 g/10 min and more preferably at least 5 g/10 min, and still more preferably at least 10 g/10 min., as measured in accordance with ASTM D 1238, at 372° C. using a 5 kg weight on the molten polymer.

While the low molecular weight of PTFE micropowder imparts melt flowability to the polymer, the PTFE micropowder by itself is not melt fabricable, i.e. an article molded from the melt of PTFE micropowder is useless, by virtue of extreme brittleness. Because of its low molecular weight (relative to non-melt-flowable PTFE), it has no strength. An extruded filament of PTFE micropowder is so brittle that it breaks upon flexing. Generally, compression molded plaques cannot be made for tensile or flex testing of the PTFE micropowder used in the present invention, because the plaques crack or crumble when removed from the compression mold, whereby neither the tensile property nor MIT Flex Life can be tested. In effect, this polymer has no (0) tensile strength and an MIT Flex Life of zero cycles. In contrast, PTFE is flexible, rather than brittle, as indicated e.g. by an the MIT flex life (ASTM D-2176, using an 8 mil (0.21 mm) thick compression molded film) of at least 1000 cycles, preferably at least 2000 cycles.

The invention is also useful for producing dispersions of melt-processible fluoroplastics, including perfluoroplastics, that are also melt-fabricable. Melt-processible means that the fluoroplastic can be processed in the molten state, i.e., fabricated from the melt using conventional processing equipment such as extruders and injection molding machines, into useful shaped articles such as films, fibers, and tubes. Melt-fabricable means that the resultant fabricated articles exhibit sufficient strength and toughness to be useful for their intended purpose after the processing in the molten state. This sufficient strength may be characterized by the fluoroplastic by itself exhibiting an MIT Flex Life of at least 1000 cycles, preferably at least 2000 cycles, measured as described above. The strength of the fluoroplastic is indicated by it not being brittle. The fluoroplastics described hereinafter are melt processible and melt fabricable unless otherwise indicated.

Examples of such melt-processible fluoropolymers, preferably fluoroplastics, most preferably perfluoroplastics, include homopolymers such as polychlorotrifluoroethylene and polyvinylidene fluoride (PVDF) and copolymers of tetrafluoroethylene (TFE) and at least one perfluorinated copolymerizable monomer (comonomer) present in the polymer usually in sufficient amount to reduce the melting point of the copolymer substantially below that of PTFE, e.g., a melting temperature no greater than 315° C.

A melt-processible TFE copolymer typically incorporates an amount of comonomer into the copolymer in order to provide a copolymer which has a melt flow rate (MFR) of 0.1 to 200 g/10 min as measured according to ASTM D-1238 using a 5 kg weight on the molten polymer and the melt temperature which is standard for the specific copolymer. MFR will preferably range from 1 to 100 g/10 min, most preferably about 1 to about 50 g/10 min.

A preferred melt-processible copolymer for use in the practice of the present invention comprises at least 40-99 mol %, preferably 60-99 mol % tetrafluoroethylene units and 1-60 mol %, preferably 1-40 mol % of at least one other monomer, to total 100 mol %. Preferred comonomers with TFE to form perfluoroplastics are perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers. Preferred TFE copolymers include FEP (TFE/HFP copolymer), PFA (TFE/PAVE copolymer), TFE/HFP/PAVE wherein PAVE is PEVE and/or PPVE, and MFA (TFE/PMVE/PAVE wherein the alkyl group of PAVE has at least two carbon atoms). The standard conditions for MFR determination under ASTM D 1238 for FEP and PFA are the use of a 5 kg weight on the molten polymer in the plastometer and a melt temperature of 372° C. within the plastometer.

The present invention is also applicable to polymerizing fluoromonomer that provides —$CH_2$— recurring groups in the polymer chain, along with perhalocarbon recurring groups preferably TFE and/or HFP, wherein the resultant polymer is a fluoroplastic, not fluoroelastomer. Preferably the hydrogen content of the fluoroplastic is 5 wt % or less, based on the total weight of the fluoroplastic. An example of such a fluoroplastic is TFE/vinylidene fluoride-based copolymer, wherein the amount of $VF_2$ and other monomers incorporated into the TFE copolymer is insufficient to impart fluoroelastomer characteristics to the copolymer (see Example 11). Preferred fluoroplastics comprise 25 wt % $VF_2$ or less, more preferably, 20 wt % or less, even more preferably 15 wt % or less.

Preferred fluoroplastics are the perfluoroplastics selected from the group consisting of PTFE, and the melt-fabricable copolymers mentioned above comprising 60-98 wt % tetrafluoroethylene units and 2-40 wt % of at least one other perfluoromonomer. Another group of preferred fluoroplastics are those in which the polymer chain is composed of greater than 75 wt % perhalomonomer units, preferably TFE, HFP, and mixtures thereof, preferably at least 78 wt % of such recurring units, more preferably at least 80 wt % of such recurring units, and most preferably at least 85 wt % of such units. TFE is the preferred halocarbon recurring unit. The remaining recurring units, to total 100 wt % of the copolymer, can be selected from C—H containing comonomer or halocarbon comonomer, preferably perfluoroolefins such as HFP and PAVE monomers described above.

The Polymerization Process

The polymerization process is carried out in a polymerization reactor. The description of the polymerization process as preparing fluoropolymer or the dispersion thereof in the aqueous polymerization medium, also applies to the preparation of fluoroplastics and perfluoroplastics as dispersions in the aqueous medium. The reactor is equipped with a stirrer for the aqueous medium within the reactor to provide eventual sufficient interaction between free-radicals and monomers such as TFE at and after kickoff of the polymerization reaction for desirable reaction rates and uniform incorporation of comonomers if employed in the polymerization reaction. The reactor preferably includes a jacket surrounding the reactor so that the reaction temperature may be conveniently controlled by circulation of a controlled temperature heat exchange medium. The aqueous medium is preferably deionized and deaerated water. The same is true for the water in any solution added to the reactor, such as solutions containing polymerization initiator and stabilizing surfactant. The temperature of the reactor and thus of the aqueous medium will be from 25 to 120° C., preferably 40 to 120° C., more preferably 50 to 120° C., even more preferably 60 to 120° C., and most preferably 70 to 120° C. In operation, the reactor is pressured up with fluoromonomer. Pressuring up the reactor is the addition of fluoromonomer to the reactor to increase the reactor internal pressure to or near the pressure at which the polymerization reaction will be commenced and/or carried out (operating pressure). Typical pressures (operating pressure) that will be used will be from 30 to 1000 psig (0.3 to 7.0 MPa), preferably from 1 to 800 psig (0.1 to 5.6 MPa). An aqueous solution of free-radical polymerization initiator can then pumped into the reactor in sufficient amount to cause kicking off of the polymerization reaction. The kicking off (kickoff) of the polymerization reaction is the commencement of polymerization. For simplicity, this kicking off is indicated by a reduction in reactor pressure, e.g. by a pressure drop of 10 psi (69 kPa), indicating the commencement of fluoromonomer consumption in the polymerization process and thereby commencement of the polymerization reaction. This amount of pressure drop is taken as meaning that the pressure drop is caused by the consumption of fluoromonomer. One skilled in the art may rely on a smaller pressure drop if there is confidence that the smaller pressure drop is not just a variation in internal reactor pressure that is not the commencement of polymerization. One skilled in the art may rely on a different parameter altogether as indicating the commencement of the polymerization. For example, in a pressure demand system, reduction in reactor pressure is immediately compensated by the flow of monomer into the reactor to maintain pressure, In this system, the flow of a certain amount of pressure demand monomer into the reactor is considered to indicate commencement of the polymerization reaction. Whatever parameter is relied upon, the same parameter should be used from batch to batch so as to provide results, such as batch time, that are comparable. Relatively inactive fluoromonomer such as hexafluoropropylene (HFP), which is intended for copolymerization in the polymerization reaction, such as with TFE, can already be present in the reactor prior to pressuring up with the more active TFE fluoromonomer. After kickoff, additional fluoromonomer is fed into the reactor to maintain the internal pressure of the reactor at the operating pressure. The aqueous medium is stirred to obtain the polymerization reaction rate and uniform incorporation of comonomer, if present.

As described in Process 2, the stabilization period is preferably subsequent to the initial period. Addition of the hydrocarbon-containing stabilizing surfactant is delayed until after the kickoff has occurred in Process 1 and until the stabilization period in Process 2. The amount (timing) of the delay will depend on the surfactant being used and the fluoromonomer(s) being polymerized. The function of the hydrocarbon-containing surfactant in Process 1 and Process 2 is to stabilize the dispersion of fluoropolymer particles formed during the polymerization process, hence the polymerization occurring in the presence of this hydrocarbon-containing surfactant, including hydrocarbon surfactant, being described as the stabilization period in Process 2. Stabilization of the fluoropolymer particles means that these particles are dispersed within the aqueous medium during stirring rather than agglomerating with one another to form coagulum. Coagulum is undispersible fluoropolymer formed during the polymerization. This undispersible fluoropolymer consists of fluoropolymer if any, that adheres to the interior wall of the reactor and all unadhered fluoropolymer that is not dispersed in the polymerization medium. This dispersion persists upon completion of the polymerization reaction and the stirring discontinued. This disclosure of stabilization effect and the description of coagulum with reference to fluoropolymer also applies when the fluoropolymer is the preferred fluoroplastic, most preferably, perfluoroplastic.

The polymerization process of the present invention preferably has two conditions as mentioned above with respect to surfactant. First, at the time of kickoff of the polymerization reaction in Process 1, the aqueous polymerization medium is preferably essentially free of surfactant, both water-soluble hydrocarbon-containing surfactant (and hydrocarbon surfactant) and halogen-containing surfactant (and fluorosurfactant). Second, the stabilizing surfactant, which is hydrocarbon-containing surfactant, preferably hydrocarbon surfactant, is preferably not added to the aqueous polymerization medium until after polymerization kickoff has occurred in polymerization Process 1 and after the initial period in Process 2.

With respect to the essential freedom from hydrocarbon-containing surfactant, the amount of hydrocarbon-containing surfactant, including hydrocarbon surfactant, that can be present in the aqueous medium prior to polymerization kickoff without being detrimental to the polymerization reaction will depend on the particular hydrocarbon-containing surfactant. Generally such amount preferably should be no more than 50 ppm, preferably no more than 40, 30, 20 or 15 ppm. The definition of ppm herein is given under the Examples. Moreover, such presence of the hydrocarbon-containing surfactant would not be sufficient to stabilize the eventual dispersion of fluoropolymer particles. Paraffin wax may be present in the aqueous medium to reduce coagulum formation. This is a hydrocarbon material that is not sufficiently water soluble to inhibit the polymerization reaction. These ppm amounts also apply to the essential freedom from halogen-containing surfactant, including fluorosurfactant, in the aqueous polymerization medium before kicking off of the polymerization reaction in Process 1 and in the initial dispersion of fluoropolymer particles in the initial period of the polymerization process of Process 2. These ppm amounts also apply to the polymerization reactor being essentially free of hydrocarbon-containing compound in the initial period in accordance with a preferred form of Process 2. Most preferably the amount of any and all halogen-containing surfactant, including fluorosurfactant, present in the aqueous polymerization medium is no greater than 5 ppm, and most preferably, no halogen containing surfactant is added to the polymerization reactor at any time during the practice of the polymerization process of the present invention including the embodiments set forth as Processes 1 and 2.

With respect to the delay in adding the hydrocarbon-containing surfactant to the aqueous medium as the stabilizing surfactant, this delay is beneficial in reducing any telogenic effect of the stabilizing surfactant on the polymerization. This delay can be measured in terms of the concentration of fluoropolymer formed in the aqueous polymerization medium when addition of the stabilizing surfactant to the aqueous medium commences, and can be represented by the following equation:

Concentration of fluoropolymer in wt %=([$A$÷($B$+$A$)]×100, wherein A is the weight of dispersed fluoropolymer formed before addition of the surfactant commences and B is the weight of water in the polymerization reactor at the time stabilizing surfactant addition commences. The water additions comprising B (in the equation above) to the reactor may include dissolved ingredients, such as initiator. For simplicity, the water additions are each considered to be entirely of water as indicated by the calculations of the concentration of fluoropolymer shown in Example 1. All the fluoropolymer that is formed is considered to be present in the aqueous medium. A is determined by the amount (weight) of fluoromonomer consumed up until the time the surfactant addition commences since no coagulum will have formed so early in the polymerization reaction. When the fluoromonomer is the monomer that maintains the pressure (operating) of the polymerization process within the reactor, the amount of fluoromonomer consumed is the amount fed to the reactor to maintain (makeup) this pressure until stabilizing surfactant addition commences. When comonomer is present and its amount is not determined by makeup to maintain pressure, it is assumed that the incorporation of the comonomer into the fluoropolymer is uniform. The amount of polymer produced (A) can then be calculated by the consumed fluoromonomer, e.g. TFE, fed to the reactor divided by the quantity 1 minus the weight fraction of comonomer in the fluoropolymer. B is the sum of the weight of all water additions to the reactor until surfactant addition commences. Thus, B includes the weight of the initial amount of water charged to the reactor and all additional water charges, such as in the form of solutions of nucleant surfactant, salt (if present), and oxidizing agent discussed in the section Polymerization Sites, initiator for kick off of the polymerization reaction, and additional initiator pumped into the aqueous medium up until the time surfactant addition commences.

It has been found that premature addition of the hydrocarbon-containing stabilizing surfactant to the aqueous polymerization medium excessively inhibits the polymerizing of fluoromonomer to fluoropolymer, Thus, it is preferred that the concentration of fluoropolymer in the aqueous polymerization medium is at least 0.6 wt % when the surfactant addition commences, more preferably at least 0.7, or at least 0.8, or at least 1 wt %. Even more preferably, the fluoropolymer concentration is at least 1.2 wt % and for melt fabricable fluoropolymer such as FEP and PFA, the concentration is preferably at least 2 wt %, and for PTFE, the concentration is preferably at least 1 wt %, more preferably at least 1.6 wt %. These concentrations of fluoropolymer also apply to fluoroplastics and perfluoroplastics. The maximum delay in commencing the metering of the stabilizing surfactant will depend on the fluoromonomer(s) being polymerized and the coagulum wt % considered acceptable for the solids content of the dispersion to be obtained.

When addition of the hydrocarbon-containing stabilizing surfactant to the aqueous polymerization medium begins, this addition is preferably done by metering the surfactant into the aqueous medium at a rate that reduces the telogenic activity of the stabilizing surfactant while maintaining surface activity to form a stable dispersion of fluoropolymer, preferably fluoroplastic, more preferably perfluoroplastic, particles in the aqueous polymerization medium. Preferably, the metering rate is 0.005 to 1.4 g/l-hr, more preferably 0.005 to 1.0 g/l-hr, and even more preferably 0.01 to 0.8 g/l-hr. In the expression g/l-hr, g is the weight in grams of the surfactant by itself, l is the reactor volume in liters, and hr is the unit of time. The preferred metering rate for high solids dispersions is set forth in EXAMPLE 10. The time increments for the addition of the hydrocarbon-containing stabilizing surfactant, including hydrocarbon surfactant, are preferably at least every 20 minutes, preferably at least every 10 min, more preferably at least every 5 min, and/or most preferably, continuously, during the polymerization reaction. The amount of such surfactant added and its timing of addition will depend on the fluoromonomer(s) being polymerized. Too little surfactant results in increased coagulum, and too much surfactant slows down the polymerization reaction and inhibits the growth of polymer chains. Each of these metering rates can be used with each of the weight % concentrations of fluoropolymer, fluoroplastic, and perfluoroplastic mentioned above with respect to the commencement of the surfactant addition. The metering rates apply to the surfactant, not to the solution within which the surfactant is present as added to the aqueous medium in the reactor.

With respect to the hydrocarbon-containing surfactant that is used in the process of the present invention to stabilize the dispersion of fluoropolymer, fluoroplastic, and perfluoroplastic particles formed by the process, this surfactant is a compound that has hydrophobic and hydrophilic moieties, which enables it to disperse and stabilize hydrophobic entities such as the aforesaid particles, in an aqueous medium. This definition also applies to surfactant that the aqueous medium is as essentially free of at the carrying out of the steps (b) and (c) of the polymerization Process 1 and, in the preferred form of Process 2 in which the aqueous medium is essentially free of water-soluble hydrocarbon-containing compound after the preparation of the initial dispersion in the initial period, and the water-soluble hydrocarbon-containing compound is selected from cationic surfactants, nonionic surfactant and anionic surfactants.

The hydrocarbon-containing stabilizing surfactant, including hydrocarbon surfactant, is preferably an anionic surfactant. An anionic surfactant has a negatively charged hydrophilic portion such as a carboxylate, sulfonate, or sulfate salt and a long chain hydrocarbon portion, such as alkyl as the hydrophobic portion. In the stabilization context, surfactants stabilize polymer particles by coating the particles with the hydrophobic portion of the surfactant oriented towards the particle and the hydrophilic portion of the surfactant in the water phase. The anionic surfactant adds to this stabilization, the feature of being charged to provide repulsion of the electrical charges between particles. Surfactants typically reduce surface tension of the aqueous medium containing the surfactant significantly.

One example anionic hydrocarbon surfactant is the highly branched C10 tertiary carboxylic acid supplied as Versatic® 10 by Resolution Performance Products.

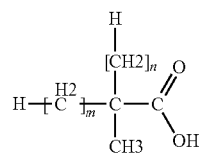

Versatic® 10
Neodecanoic acid (n + m = 7)

Another useful anionic hydrocarbon surfactant is the sodium linear alkyl polyether sulfonates supplied as the Avanel® S series by BASF. The ethylene oxide chain provides nonionic characteristics to the surfactant and the sulfonate groups provide certain anionic characteristics.

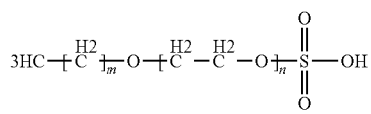

Avanel®
S-70 (n = 7, m = 11 - 14)
S-74 (n = 3, m = 8)

Another group of hydrocarbon surfactants are those anionic surfactants represented by the formula R-L-M wherein R is preferably a straight chain alkyl group containing from 6 to 17 carbon atoms, L is selected from the group consisting of —ArSO$_3^-$, —SO$_3^-$, —SO$_4$—, —PO$_3^-$ and —COO$^-$, and M is a univalent cation, preferably H$^+$, Na$^+$, K$^+$ and NH$_4^+$. —ArSO$_3^-$ is aryl sulfonate. Preferred of these surfactants are those represented by the formula CH$_3$—(CH$_2$)$_n$-L-M, wherein n is an integer of 6 to 17 and L is selected from —SO$_3$M, —PO$_3$M or —COOM and L and M have the same meaning as above. Especially preferred are R-L-M surfactants wherein the R group is an alkyl group having 12 to 16 carbon atoms and wherein L is sulfate, and mixtures thereof, such as sodium dodecyl sulfate (SDS). For commercial use, SDS (sometimes referred to as sodium lauryl sulfate), is typically obtained from coconut oil or palm kernel oil feedstocks, and contains predominately sodium dodecyl sulfate but may contain minor quantities of other R-L-M surfactants with differing R groups.

Another group of surfactants are the siloxane surfactants. Siloxane surfactants and polydimethylsiloxane (PDMS) surfactants in particular, are described in Silicone Surfactants, R. M. Hill, Marcel Dekker, Inc., ISBN: 0-8247-00104. The structure of the siloxane surfactant comprises defined hydrophobic and hydrophilic portions, the hydrophilic portion imparting water solubility to the surfactant. The hydrophobic portion comprises one or more dihydrocarbylsiloxane units:

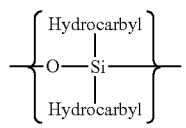

wherein the substitutions on the silicon atoms in the siloxane chain are entirely hydrocarbyl. In the sense that the carbon atoms of the hydrocarbyl groups are entirely substituted with hydrogen atoms where they could be substituted by halogen such as fluorine, these siloxane surfactants can also be considered as hydrocarbon surfactants, i.e. the monovalent substituents on the carbon atoms of the hydrocarbyl groups are hydrogen.

The hydrophilic portion of the siloxane surfactant may comprise one or more polar moieties including ionic groups such as sulfate, sulfonate, phosphonate, phosphate ester, carboxylate, carbonate, sulfosuccinate, taurate (as the free acid, a salt or an ester), phosphine oxide, betaine, betaine copolyol, or quaternary ammonium salt.

Examples of hydrocarbon surfactants that are siloxane-based and that are anionic are such surfactants available from Noveon Consumer Specialties, Inc, a division of Lubrizol Advanced Materials, Inc., as follows:

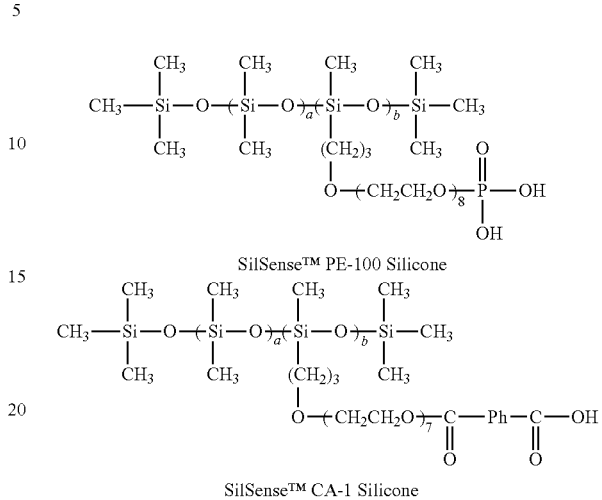

SilSense™ PE-100 Silicone

SilSense™ CA-1 Silicone

Another example of anionic hydrocarbon surfactant useful in the present invention is the sulfosuccinate surfactant Lankropol® K8300 available from Akzo Nobel Surface Chemistry LLC. The surfactant is reported to be the following:
Butanedioic acid, sulfo-, 4-(1-methyl-2-((1-oxo-9-octadecenyl)amino)ethyl) ester, disodium salt; CAS No.:67815-88-7

Additional sulfosuccinate hydrocarbon surfactants useful in the present invention are diisodecyl sulfosuccinate, Na salt, available as Emulsogen® SB10 from Clariant, and diisotridecyl sulfosuccinate, Na salt, available as Polirol® TR/LNA from Cesapinia Chemicals.

The preferred hydrocarbon surfactants as the stabilizing surfactant in the polymerization process are the anionic surfactants, and the most preferred of these surfactants are the R-L-M surfactants described above, especially sodium dodecyl sulfate (SDS).

With respect to the water-soluble free-radical polymerization initiator used in the polymerization process of the present invention (step (c) described in Process 1 and causing the polymerizing, especially in the stabilization period of Process 2, this initiator is added to the aqueous polymerization medium in the reactor to cause the polymerization reaction in the pressured-up reactor to kickoff. The amount of initiator added will depend on the fluoromonomer being polymerized. Preferred initiators are the highly active water-soluble salts of inorganic initiators such as the inorganic peracids. Preferred initiators are the persulfate salts, e.g., ammonium persulfate or potassium persulfate. Preferred persulfate initiators are substantially free of metal ions and most preferably are ammonium salts. For polymerization of TFE to PTFE, however, the preferred initiator is organic peracid such as disuccinic acid peroxide (DSP), which is highly inactive, thereby requiring a large amount to cause kickoff, e.g. at least 600 ppm, together with a highly active initiator, such as inorganic persulfate salt, in a smaller amount. The activity of the initiator refers to the ability of the initiator to form free radicals capable of initiating polymerization in the aqueous polymerization medium at the temperature of the medium within the reactor, from 25, 40, 50, 60 or 70 to 120° C., referred to above, at which the polymerization reaction is carried out. The selection of initiator and polymerization temperature is preferably matched so that the free-radicals arising from the initiator are caused by the temperature of the aqueous medium, whether the free radicals are thermally induced or their formation is assisted by the presence of promoter or reducing agent. The polymerization initiator is preferably free of alkali metal ion. The initiator added to cause kickoff can be supplemented by additional initiator as may be necessary as the polymerization reaction proceeds.

The amount and identity of fluoromonomer present at kickoff will depend on the fluoropolymer, fluoroplastic, or perfluoroplastic being made. In the case of modified PTFE, the modifying monomer will generally all be added at the time of the precharge to the reactor. The same can be true for comonomer used in the polymerization with TFE to form melt processible fluoroplastics, although comonomer can be added as the polymerization reaction proceeds. Once polymerization begins, additional TFE (and comonomer, if any) is added to maintain the reactor pressure desired. Chain transfer agents can be added when molecular weight control is desired For some polymerizations, additional polymerization initiator may be added during the polymerization.

After completion of the polymerization (typically several hours) when the desired amount of polymer or solids content has been achieved, agitation and the feeds are stopped. This stopping of agitation and stopping of fluoromonomer feed is the completion of the polymerization reaction. The reactor is vented, and the raw dispersion of fluoropolymer, including fluoroplastic and perfluoroplastic particles in the reactor is transferred to a cooling or holding vessel. Thus, the polymerization process is a batch process.

The solids content of the aqueous dispersion, which is the dispersion of the aforesaid particles produced by the process of the invention, is preferably at least 10% by weight, preferably at least 16 wt %. More preferably, the fluoropolymer, including fluoroplastic, or perfluoroplastic solids content is at least 20% by weight. Solids contents up to 33-35 wt % are obtainable by any process of the present invention. Surprisingly, much higher solids contents, e.g. of 45 wt % and greater than 45 wt % are also obtainable as described in EXAMPLE 10. Solids contents up to 60 wt % and even up to 65 wt % are obtainable. Solids content is the weight % of these fluoropolymer particles dispersed in the aqueous medium, based on the combined weight of these particles and total water added to the reactor. The total water is the total amount of water added during polymerization process, including any water added to the reactor prior to kickoff of the polymerization reaction. The calculation of wt % solids content is as follows: 100×[weight of fluoropolymer particles in the dispersion÷(weight of said fluoropolymer particles+total weight of water)]. Solutions of ingredients added to the aqueous medium, such a initiator solution, are considered to be entirely water in the calculation of solids content. The preferred particle size (Dv(50)) of the fluoropolymer, including fluoroplastic and perfluoroplastic particles in the aqueous dispersion thereof is preferably from 100 to 300 nm.

Preferably, the amount of fluoropolymer, including fluoroplastic and perfluoroplastic present as coagulum formed by the polymerization is no greater than 5 wt % of the total amount of fluoropolymer, fluoroplastic, or perfluoroplastic, respectively, made. In the preferred process of the invention, polymerizing produces no greater than 3 wt %, or no greater than 2 or 1 wt %, most preferably no greater than 0.5 wt % of such polymer present as coagulum. More preferably, the amount of coagulum is less than each of these amounts. The maximum solids content is preferably controlled to minimize coagulum to an amount described above.

The as-polymerized dispersion can be transferred to a dispersion concentration operation which produces concentrated dispersions stabilized typically with nonionic hydrocarbon surfactants by known methods. Hydrocarbon surfactant can be used for this purpose because the concentration of the dispersion in the aqueous medium is carried out after completion of the polymerization. Solids contents of concentrated dispersion is typically 35 to 70% by weight, more often 45 to 65 wt %. EXAMPLE 10 discloses solids contents above 45 wt % being obtained directly from polymerization, thereby not requiring any concentration step. Alternatively, for use as a molding resin, a fluoropolymer resin is isolated from the fluoropolymer dispersion usually by coagulation and the aqueous medium is removed. The fluoropolymer is dried then processed into a convenient form such as flake, chip or pellet for use in subsequent melt-processing operations. Certain grades of PTFE dispersion are made for the production of fine powder. For this use, the dispersion is coagulated, the aqueous medium is removed and the PTFE is dried to produce fine powder.

Passivation of the Hydrocarbon-Containing Surfactant

In a preferred embodiment of any of the embodiments of polymerization processes of the present invention disclosed herein, the hydrocarbon-containing surfactant used to stabilize the dispersion of fluoropolymer, including fluoroplastic and perfluoroplastic, particles, is passivated. It is also preferred that the passivated stabilizing surfactant is anionic. Passivation is the treatment of the hydrocarbon-containing surfactant to reduce its telogenicity.

In one embodiment, the stabilizing surfactant as metered (added) into the aqueous polymerization medium is passivated prior to metering (addition) into the aqueous medium. Preferably, the passivated stabilizing surfactant is the reaction product of this surfactant and an oxidizing agent such as hydrogen peroxide. The reaction forming this reaction product is preferably conducted in an aqueous medium at a temperature of no greater than 50° C. This temperature of reaction is in contrast to the temperature of the aqueous medium within which the polymerization reaction is most often carried out, i.e. at a temperature of at least 60° C.

The reduction in telogenicity of the stabilizing surfactant resulting from passivation provides improvements including one or more of the following: 1) reducing the polymerization time to produce the desired fluoropolymer solids content in the aqueous medium, without any appreciable increase in coagulum and/or 2) reducing the time of delay after kickoff before the stabilizing surfactant can be added to the aqueous medium. Thus, passivation preferably increases the effectiveness of the surfactant. While telogenicity is reduced by passivation, the passivated surfactant still performs its surfactant function of stabilizing the dispersion of fluoropolymer particles in the aqueous medium.

Passivation can be carried out by reacting the stabilizing surfactant with hydrogen peroxide in aqueous solution. A passivation adjuvant for the oxidation reaction is preferably also used to accelerate (catalyze) the oxidation reaction. This adjuvant is preferably metal ion that is preferably provided in a form which is soluble in the aqueous medium in the polymerization reactor. This solubility can be achieved by the metal ion being in salt form, i.e. the metal ion is the cation of the salt. Preferably the salt is inorganic and the anion of the salt can be any anion that provides this solubility, with or without water of hydration included in the salt. The anion, however, should not have an adverse effect on the polymerization reaction or fluoropolymer product. Examples of preferred anions of the metal salt include sulfate, sulfite, and chloride.

Preferably, the metal of the metal ion has multiple positive valences, sometimes referred to as multiple oxidation states. Examples of metal ion catalysts for the oxidation with hydrogen peroxide include Fe, Mn and Cu.

Even with acceleration, the oxidation reaction using hydrogen peroxide as the oxidizing agent is slow, taking for example at least 30 min. to completion. A procedure for carrying out the oxidation can be as follows: A solution of the stabilizing surfactant in water is formed. The $Fe^{+2}$ metal ion as iron sulfate hydrate passivation adjuvant is added and dissolved in this solution. The pH of the solution can be adjusted by addition of appropriate reagent to promote the oxidation reaction. The solution is agitated and hydrogen peroxide is slowly added to the solution. The weight ratio of peroxide, to $Fe^{+2}$ can be generally from 20:1 to 400:1, preferably from 30:1 to 300:1 and more preferably from 60:1 to 200:1. The weight ratio of peroxide to stabilizing surfactant, such as SDS, can be from 0.15:1 to 3.5:1, preferably from 0.3:1 to 2.6:1, and more preferably, from 0.5:1 to 1.6:1. Upon completion of the oxidation reaction, the resultant aqueous solution can be used for adding the passivated surfactant to the aqueous polymerization medium during the polymerization reaction in the manner described above. Thus, the water of the aqueous solution is preferably deaerated and deionized, as is done for the aqueous polymerization medium, so that the water added to the reactor along with the passivated surfactant is not detrimental to the polymerization reaction or the fluoropolymer obtained. These proportions of reactants and passivation adjuvant, if present, apply to the passivation of any and all the hydrocarbon-containing and hydrocarbon surfactants mentioned above for stabilization of the fluoropolymer particle dispersion.

When prepared separately from the aqueous polymerization medium, the passivated surfactant is uniform in its composition within the aqueous solution within which the passivation reaction is carried out. This means that the composition of the passivated surfactant fed into the reactor aqueous medium is the same at the end of the polymerization reaction as the composition at the commencement of its feed to the reactor.

Use of hydrogen peroxide to passivate the stabilizing surfactant does not create any salt that would accompany the feed of the passivated surfactant solution to the reactor. Salt when present in sufficient amount during the polymerization reaction can be detrimental, such as by causing increased coagulum.

The temperature of the aqueous solution within which the passivation reaction is carried out using hydrogen peroxide as the oxidizing agent is important. The preferred temperature range that is effective for causing the peroxide to react oxidatively with the stabilizing surfactant is 1 to 50° C., preferably 5 to 45° C. and most preferably 10 to 45° C. As the temperature increases from 45° C., reactivity falls off sharply and is virtually non-existent at temperatures above 50° C. Thus, the desired passivation effect is not obtained at the usual polymerization temperatures of 60° C. and higher. The passivation reaction using hydrogen peroxide as the oxidizing agent is therefore preferably carried out separately from the aqueous polymerization medium.

The passivation effect is determined by conducting the oxidation reaction between the stabilizing surfactant and hydrogen peroxide at different aqueous solution temperatures and thereafter using the passivated surfactant as the stabilizing surfactant added to the aqueous polymerization medium in the polymerization of fluoromonomer, and comparing the polymerization (batch) times required to obtain a given fluoropolymer, including fluoroplastic and perfluoroplastic, solids content in the aqueous polymerization medium. Preferably the passivation is effective such that the batch time is decreased by at least 10%, preferably at least 20%, more preferably at least 35% and most preferably at least 50%. Batch time is the time from polymerization kickoff until completion of the polymerization reaction for a given solid content result of the polymerization reaction. When different solids contents of the aqueous dispersion of these fluoropolymer particles are being prepared, productivity is better measured by space-time yield (STY) of the polymerization reaction. In STY, space (S) is the volume of the reactor, time (T) is the time from kickoff of the polymerization reaction until completion, and yield (Y) if the weight of dispersed fluoropolymer formed. STY is expressed herein as gm(of dispersed fluoropolymer)/l-hr. The increased STY resulting from the passivation of the stabilizing surfactant can be characterized by the same percents as stated earlier in this paragraph.

In another embodiment, the stabilizing surfactant is passivated prior to, during, or after addition to the aqueous medium in the polymerization reactor using a different oxidizing agent than hydrogen peroxide, each of these being preferred timing for the passivation reaction. In effect, this timing of the passivation is the passivation outside the reactor and inside the reactor. Passivation is preferably carried out during or after addition to the aqueous reactor. Passivation most preferably is carried out after the surfactant enters the reactor, so the passivation in the aqueous medium occurs within the reactor. In this embodiment, the passivated stabilizing surfactant is the reaction product of this surfactant and as the oxidizing agent, water-soluble polymerization initiator, preferably the initiator being used to cause the polymerization reaction to form the dispersion of fluoropolymer, including fluoroplastic and perfluoroplastic particles in the aqueous medium. In this embodiment of the process, passivation is preferably carried out at the same temperature as the polymerization, preferably in the range of from 25, 40, 50, 60 or 70 to 120° C., as mentioned above.

Preferably, this passivation reaction is carried out in the presence of passivation adjuvant, which is preferably metal ion supplied to this reaction in the form described above with respect to the metal ion used to catalyze the reaction between the oxidizing agent and the stabilizing surfactant. Experimentation has shown that the presence of the metal ion can reduce batch time by 66% and increase STY by 300%.

Preferred metal ions include those of Groups 2-12 of the Periodic Table of the Elements. Such Periodic Table is that which is disclosed on the back of the front cover of M. S. Silverberg, *Chemistry, The Molecular Nature of Matter and Change*, 5 Ed., published by McGraw-Hill Higher Education (2009). The Group numbering for this Table is 1 to 18 in accordance with 2010 IUPAC format, sometimes called "new notation". This Group numbering is referred to herein. This Group numbering applies to vertical columns of elements in the Periodic Table.

The most preferred metal ions are the transition metals, notably those in Groups 3-12 and of these, the most preferred are those in Groups 6-12, even more preferred Groups 7-12 and most preferred those in Groups 7-11. The Periodic Table also has horizontal grouping of elements called Periods that are numbered 1-7, starting with H of the Group 1 elements and ending with Fr of the Group 1 elements as Period 7. Among the transition metals, those in the horizontal Period 4 are most preferred. Included in the term "transition metals" are the "inner transition metal, i.e. the lanthanides and the actinides.

Preferred transition metals include Mn, Fe, Co, Ni, Cu, Zn, Ce, and Ag, with Fe and Cu being most preferred. One of the characteristics of most of the transition metals preferably used in the present invention is that they have multiple positive valences, sometimes referred to as multiple oxidation states. Fe, for example has valences of +2 and +3, and Cu has valences of +1 and +2. The most preferred metal ions are ferrous ion and cuprous ion. The metal ions used to catalyze the polymerization initiator/stabilizing surfactant oxidation reaction can also be used to catalyze the oxidation of the stabilizing surfactant in general, including when hydrogen peroxide is the oxidizing agent. The selection of metal ion will depend on the oxidizing agent used. For hydrogen peroxide, the preferred metal ions are the ions of Fe, Mn, and Cu.

When the oxidizing agent is polymerization initiator, the salt providing the metal ion can be added to the aqueous medium in the polymerization reactor as an aqueous solution together with the aqueous solution of stabilizing surfactant or independent therefrom, metered into the aqueous medium along with metering of the surfactant into the aqueous medium, metered independently into the aqueous medium, or added all at one time to the aqueous medium. If the polymerization reaction is preceded by the formation of hydrocarbon-containing polymerization sites as will be described hereinafter, the addition of the passivation adjuvant as metal ion to the aqueous medium is preferably delayed until after the formation of these sites has at least commenced to avoid the formation of excessive coagulum. Thus, addition of the metal ion as passivation adjuvant to the aqueous medium is preferably delayed until after commencement (kick off) of the polymerization reaction.

The rapidity of the passivation reaction using polymerization initiator together with passivation adjuvant, enables this passivation reaction to be carried out prior to, during or after addition of the stabilizing surfactant to the aqueous medium in the polymerization reactor. The "prior to" passivation reaction can be carried out in the holding vessel for the aqueous solution of the stabilizing surfactant, by adding the passivation adjuvant and polymerization initiator to this vessel. The "during" passivation reaction can be carried out by co-feeding aqueous solutions of the stabilizing surfactant, passivation adjuvant, and polymerization initiator together into the reactor such that these solutions intermix during the addition to the reactor. The passivation reaction during this intermixing is believed to at least commence if not be completed, depending on the length of the reactor feed line containing all three ingredients. The "after" passivation reaction, i.e. passivation within the aqueous medium in the polymerization reactor, is described in the preceding paragraph.

In both passivation embodiments, the hydrocarbon-containing surfactant, including hydrocarbon surfactant, is passivated by reacting the surfactant with an oxidizing agent. In both passivation reactions, the oxidation reaction is preferably carried out in the presence of passivation adjuvant, which is preferably metal ion, in the aqueous medium, which catalyzes the oxidation reaction. The metal ion preferably has multiple positive valences, and the preferred metal ions will depend on which oxidizing agent is used as described above. In this regard, the preferred oxidizing agents are hydrogen peroxide or water-soluble polymerization initiator, preferably selected from those disclosed in the section entitled Polymerization Process. The timing of the passivation reaction will depend on the oxidizing agent used and is preferably either prior to the addition of the stabilizing surfactant to the reactor, i.e. the aqueous medium in the reactor, or during this addition to the reactor, or after this addition to the reactor.

The passivation adjuvant used in either passivation embodiment of the present invention is preferably very small. For example, the concentration of passivation adjuvant, which can be metal ion, is preferably no greater than 2 wt %, based on the weight of the hydrocarbon-containing, including hydrocarbon, surfactant in the aqueous medium at the completion of the polymerization reaction. The amount of passivation adjuvant, which can be metal ion, in the aqueous medium upon completion of polymerization is preferably no greater than 25 ppm, based on the amount of water present in the reactor upon completion of the polymerization. These amounts also apply when other passivation adjuvants are used, i.e. to the moiety thereof that enhances the reduction in telogenic behavior benefit to the hydrocarbon-containing surfactant, including hydrocarbon surfactant as a result of passivation.

Polymerization Sites

A preferred embodiment is to provide polymerization sites in the aqueous medium prior to kickoff of the polymerization process, in order to reduce the size of the fluoropolymer particles forming the dispersion thereof in the aqueous medium as a result of the polymerization process. The polymerization sites form loci for the precipitation of fluoropolymer, the number of loci being greater than if no such sites were present, thereby resulting in the smaller fluoropolymer particle size for a given percent solids. After this precipitation, the subsequent precipitation of fluoropolymer is preferably at the same loci, causing the polymer particles to grow, until the end of the polymerization reaction. This effect of polymerization sites is also applicable to fluoroplastic and perfluoroplastic and the growing particles of fluoroplastic or perfluoroplastic resulting from the polymerization. The polymerization sites are the precursor to the initial dispersion of fluoropolymer particles described in Process 2.

One method of forming these polymerization sites is to start with already polymerized particles present in the aqueous polymerization medium prior to kickoff of the polymerization reaction. These already polymerized particles are often called polymer seeds. The seeds may be formed by free-radical initiated polymerization of fluoromonomer in the presence of surfactant so that the polymer seeds remain dispersed in the aqueous medium within which they are formed. The subsequent kickoff of the polymerization reaction in the aqueous medium wherein the dispersion of polymer seeds are already present involves adding new fluoromonomer, i.e. fluoromonomer in the present invention, and new polymerization initiator to the reactor to cause the kickoff and subsequent polymerization.

The surfactant used to disperse the polymer seeds in the aqueous medium can be a halogen-containing surfactant, such as a fluorosurfactant, that has minimal to no telogenic activity, thereby not inhibiting the subsequent kickoff and polymerization reaction forming the fluoropolymer, fluoroplastic, or perfluoroplastic described in Process 1 or the polymerizing thereof occurring during the stabilization period described in Process 2. This halogen-containing surfactant may be present due to its use during polymerization of the polymer seeds. Examples of fluorosurfactants are ammonium perfluorooctanoate, ammonium ω-hydrohexadecafluorononoate, and ammonium 3,6 dioxa-2,5-di(trifluoromethyl) undecafluorononoate as disclosed in U.S. Pat. No. 3,391,099. Examples of suitable fluoroether surfactants have been described in U.S. Pat. No. 3,271,341 to Garrison; U.S. patent publications 2007/0015864, 2007/0015865, and 2007/0015866 to Hintzer et al.; U.S. patent publications 2005/0090613 to Maruya et al. and 2006/0281946 to Morita et al.; PCT patent publications WO 2007046345 to Higuchi et al., 2007046377 to Funaki et al., 2007046482 to Hoshikawa et al., and 2007/049517 to Matsuoka et al. Additional fluorosurfactants are disclosed in U.S. Pat. No. 7,705,074 (Brothers et al.), which are the combination of a fluoropolyether having a number average molecular weight of at least 800 g/mol and a short chain fluorosurfactant having the formula

$$[R^1-O_n-L-A^-]Y^+ \quad (I)$$

wherein:

R$^1$ is a linear or branched partially or fully fluorinated aliphatic group which may contain ether linkages;

n is 0 or 1;

L is a linear or branched alkylene group which may be nonfluorinated, partially fluorinated or fully fluorinated and which may contain ether linkages;

A$^-$ is an anionic group selected from the group consisting of carboxylate, sulfonate, sulfonamide anion, and phosphonate; and Y$^+$ is hydrogen, ammonium or alkali metal cation;

with the proviso that the chain length of R$^1$—O$_n$-L- is not greater than 6 atoms.

"Chain length" as used in this application refers to the number of atoms in the longest linear chain in the hydrophobic tail of the fluorosurfactant employed in the process of this invention. Chain length includes atoms such as oxygen atoms in addition to carbon in the chain of hydrophobic tail of the surfactant but does not include branches off of the longest linear chain or include atoms of the anionic group, e.g., does not include the carbon in carboxylate. "Short chain" as used in this application refers to a chain length of not greater than 6. "Long chain" refers to a chain length of greater than 6, e.g., fluorosurfactants having a chain length of 7 to 14 atoms.

Preferably, the chain length of R$^1$—O$_n$-L- is 3 to 6 atoms. In accordance with one preferred form of the invention the chain length of R$^1$—O$_n$-L- is 4 to 6 atoms. In accordance with another preferred form of the invention the chain length of R$^1$—O$_n$-L- is 3 to 5 atoms. Most preferably, the chain length of R$^1$—O$_n$-L- is 4 to 5 atoms.

The preferred short chain surfactant is the dimer acid of hexafluoropropylene epoxide, having the formula C$_3$F$_7$O—CF(CF$_3$)—COOH.

The perfluoropolyether (PFPE) acids or salts thereof can have any chain structure in which oxygen atoms in the backbone of the molecule are separated by saturated fluorocarbon groups having 1-3 carbon atoms. More than one type of fluorocarbon group may be present in the molecule. Representative structures have the repeat unit represented in the following formulas:

(—CFCF$_3$—CF$_2$—O—)$_n$ (VII)

(—CF$_2$—CF$_2$—CF$_2$—O—)$_n$ (VIII)

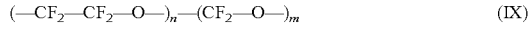

(—CF$_2$—CF$_2$—O—)$_n$—(CF$_2$—O—)$_m$ (IX)

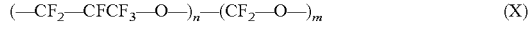

(—CF$_2$—CFCF$_3$—O—)$_n$—(CF$_2$—O—)$_m$ (X)

These structures are discussed by Kasai in J. Appl. Polymer Sci. 57, 797 (1995). As disclosed therein, such PFPE can have a carboxylic acid group or salt thereof at one end or at both ends. Similarly, such PFPE may have a sulfonic acid or phosphonic acid group or salt thereof at one end or both ends. In addition, PFPE with acid functionality at both ends may have a different group at each end. For monofunctional PFPE, the other end of the molecule is usually perfluorinated but may contain a hydrogen or chlorine atom. PFPE having an acid group at one or both ends for use in the present invention has at least 2 ether oxygens, preferably at least 4 ether oxygens, and even more preferably at least 6 ether oxygens. Preferably, at least one of the fluorocarbon groups separating ether oxygens, and more preferably at least two of such fluorocarbon groups, have 2 or 3 carbon atoms. Even more preferably, at least 50% of the fluorocarbon groups separating ether oxygens have 2 or 3 carbon atoms. Also, preferably, the PFPE has a total of at least 15 carbon atoms, e.g., the preferred minimum value of n or n+m in the above repeat unit structures is at least 5. More than one PFPE having an acid group at one or both ends can be used in a process in accordance with the invention. Typically, unless extraordinary care is employed to manufacture a single specific PFPE compound, the PFPE may contain multiple compounds in varying proportions within a molecular weight range about the average molecular weight. The number average molecular weight of the fluoropolyether acid or salt preferably has a number average molecular weight of less than 6000 g/mol.

Because the seed polymer is small in particle size, e.g. 1 to 50 nm, only a small amount of fluorosurfactant is necessary to maintain the polymer seeds as a dispersion until kickoff of the subsequent polymerization reaction, whereby the aqueous medium prior to kickoff of the polymerization reaction or in the initial period of the polymerization reaction is essentially free of halogen-containing surfactant (as described above), including fluorosurfactant. This means that removal or recovery of the fluorosurfactant, if desired, from the aqueous polymerization medium after completion of the polymerization to form the dispersion of fluoropolymer particles can be minimized.

Another Example of providing polymer as polymerization sites is disclosed in U.S. Patent Publication 2010/0160490 (Leffew et al.), wherein the polymerization sites are dispersed particulates of fluorinated ionomer.

The precipitation of polymerized fluoromonomer on these polymeric polymerization sites prior to the addition of stabilizing surfactant to the aqueous medium in the reactor can be used to provide the initial dispersion of fluoropolymer particles as described in Process 2.

Preferably, polymerization sites are hydrocarbon-containing as can be provided by oleophilic nucleation sites formed in the aqueous medium prior to kickoff of the polymerization as described in Process 1. These oleophilic nucleation sites are dispersed in the aqueous medium, enabling the precipitation of fluoropolymer, including fluoroplastic, at these sites to be finely dispersed, such that the metering of the hydrocarbon-containing stabilizing surfactant can be delayed without penalty in polymerization results. The oleophilic nucleation sites are preferably formed by the addition of small amounts of water-soluble hydrocarbon-containing compound, preferably hydrocarbon-containing surfactant containing hydrophobic moiety and hydrophilic moiety, and degradation agent, preferably an oxidizing agent, to the aqueous medium prior to the kickoff of polymerization. This degradation agent subjects the hydrocarbon-containing compound to a reaction that degrades the hydrophilic moiety, thereby enabling the hydrophobic moiety of the surfactant to become the oleophilic nucleation sites and the sites to be hydrocarbon-containing. These oleophilic nucleation sites dispersed in the aqueous medium are not polymer seeds. Thus, these sites, as formed, are preferably free of polymerized fluoromonomer.

The precipitation of polymerized fluoromonomer on these oleophilic nucleation sites prior to the addition of stabilizing surfactant to the aqueous medium in the reactor is another embodiment for providing the initial dispersion of fluoropolymer particles as described in Process 2.

The water-soluble hydrocarbon-containing compound from which the oleophilic nucleation sites are derived is preferably a surfactant. Surfactants are well known to containing hydrophobic and hydrophilic moieties, whereby they are also water soluble. The preparation of oleophilic nucleation sites, while applicable to water-soluble hydrocarbon-containing compounds in general, will be described with reference to the preferred hydrocarbon-containing surfactants, including hydrocarbon surfactants.

The preferred degradation of the hydrophilic moiety of the hydrocarbon-containing compound, preferably surfactant, causes the surfactant to lose hydrophilicity and its surfactant effect. This provides the condition described above of the subsequent kickoff of the polymerization reaction being carried out essentially free of hydrocarbon-containing surfactant (and hydrocarbon surfactant). Accordingly, the dispersion of oleophilic nucleation sites are also essentially free of hydrocarbon-containing surfactant (and hydrocarbon surfactant). No surfactant is necessary for the maintenance of the oleophilic nucleation sites as a dispersion until subsequent kickoff of the polymerization reaction.

A small amount of surfactant can, however, be present with the dispersion of oleophilic nucleation sites, if not detrimental to the kickoff of the polymerization reaction, whereby the dispersed oleophilic nucleation sites are essentially free of hydrocarbon-containing surfactant, including hydrocarbon surfactant, as described above. The amount that can be tolerated will depend on the surfactant.

In addition to the dispersion of oleophilic nucleation sites and the aqueous medium containing this dispersion being essentially free of hydrocarbon-containing surfactant, it is preferred that this dispersion and aqueous medium are also essentially free of halogen-containing surfactant, i.e. essentially free of all surfactant, as described above. If halogen-containing surfactant such as fluorosurfactant is present, then its amount should be small as described above, and most preferably, none is present.

The use of hydrocarbon-containing surfactant and especially hydrocarbon surfactant as the precursor for the oleophilic nucleation sites in the degradation reaction prior to polymerization kickoff provides a halogen-free system in the aqueous polymerization medium for the creation of the nucleation sites and the stabilization of the fluoropolymer particle dispersion subsequently obtained when the stabilizing surfactant is hydrocarbon surfactant.

The presence of the dispersion of oleophilic nucleation sites without the assistance of surfactant to maintain these sites is unexpected. This contradictory condition can be achieved, however, by how the sites are formed. The dispersion of oleophilic nucleation sites is preferably formed by degrading a water-soluble hydrocarbon-containing compound, preferably that which is a surfactant, that contains hydrophilic moiety imparting water solubility to the surfactant and hydrophobic moiety. Thus, these sites are the product of the degradation reaction. Preferably the oxidizing agent causing the degradation reaction can be a small amount of polymerization initiator added to the aqueous medium after the compound, preferably surfactant, addition. The degradation reaction is thus, preferably, an oxidation reaction. Prior to this degradation, the hydrophilic moiety of the compound, preferably the surfactant, cloaks the hydrophobic moiety with hydrophilicity, thereby allowing the compound, preferably surfactant, to be water soluble. Degradation of the water-soluble hydrocarbon-containing compound, preferably hydrocarbon containing surfactant (compound/surfactant), degrades the hydrophilicity of the compound/surfactant, i.e. the hydrophilic moiety of the compound/surfactant, thereby being effective to enable the hydrophobic moiety of the hydrocarbon-containing compound/surfactant to become the well dispersed oleophilic nucleation sites. Thus, these sites are hydrocarbon-containing oleophilic nucleation (polymerization) sites. If hydrocarbon compound, preferably surfactant, is the precursor to the nucleation sites, then they are hydrocarbon oleophilic nucleation sites. These sites are accessible to and have an affinity for the precipitating fluoropolymer formed at the kicking off of the polymerization process. The preferred precursor to the nucleation sites is hydrocarbon surfactant and the preferred nucleation sites are the hydrocarbon nucleation sites.

That the nucleation sites do not flocculate upon the degradation of the hydrophilicity of the compound is a result of the oleophilic nucleation sites being derived from a hydrocarbon-containing compound, preferably surfactant, that is soluble in the aqueous medium. The distribution of the dissolved hydrocarbon-containing compound/surfactant is on a molecular basis within the aqueous medium. The oleophilic nucleation sites obtained from the compound/surfactant enjoy this same distribution, thereby not requiring compound which is a surfactant to maintain the dispersion of oleophilic nucleation sites.

To distinguish the hydrocarbon-containing stabilizing surfactant from the hydrocarbon-containing surfactant or hydrocarbon surfactant preferably used as a precursor to the dispersion of oleophilic nucleation sites, the precursor surfactant can be referred to as the nucleant surfactant The performance of the nucleation sites is judged primarily by the small particle size of the fluoropolymer, fluoroplastic, or perfluoroplastic particles as compared to conducting the polymerization reaction without these nucleation sites being present. This performance indicates the presence of a dispersion of nucleation sites at the time of polymerization kickoff.

To obtain the pre-kick off condition of the dispersion of oleophilic nucleation sites and the aqueous polymerization medium being essentially free of hydrocarbon-containing compound, preferably hydrocarbon-containing surfactant, and preferably any other surfactant from the dispersion, preferably only a small amount (weight) of the hydrocarbon-containing surfactant as the nucleant surfactant is used as the nucleation site precursor, e.g. no more than 50 ppm. When the event is the dispersion of nucleation sites in the aqueous medium, the amount of water is that which is associated with the presence of the dispersion of these sites. This does not include after-added water such as in the form of the aqueous solutions of polymerization initiator added to cause polymerization kickoff and stabilizing surfactant used to stabilize the fluoropolymer particles formed after kickoff. The combination of a small amount of nucleant surfactant (and hydrocarbon-containing compound) together with the oxidative degradation of the hydrophilicity thereof provides the reduction in telogenicity.

The small amount of hydrocarbon-containing compound, preferably nucleant surfactant, added to the aqueous medium to form the oleophilic nucleation sites is preferably no greater than 40 ppm, even more preferably, no greater than 30 ppm, and most preferably no greater than 20 ppm. The ppm amounts of oleophilic nucleating sites present in the aqueous medium would be less than the ppm amounts disclosed herein as being added to the aqueous medium by virtue of the degradation or oxidation reaction degrading the hydrophilic moiety. The same is true for the hydrocarbon-containing compound after degradation, it no longer being the originally added compound. Thus, the amount of nucleation sites would be less than the 50 ppm, 40 ppm, 30 ppm, and 20 ppm amounts, respectively, mentioned above. Since it is believed that nucleation sites exist as molecules, only a small amount of the hydrocarbon-containing compound, preferably nucleant surfactant, can produce a large amount of oleophilic nucleation sites. Thus, addition of as little as 1 ppm of such compound/surfactant to the aqueous medium can provide beneficial effect. The foregoing amounts apply to the use of water soluble hydrocarbon compounds and to hydrocarbon-containing surfactant and hydrocarbon surfactant as nucleant surfactants and precursors in the degradation reaction and to the resultant hydrocarbon-containing and hydrocarbon oleophilic nucleation sites as well. The hydrocarbon-containing compounds and nucleant surfactants can be used individually or in combination.

The water soluble hydrocarbon-containing compounds, preferably nucleant surfactants, used as precursor to the formation of the dispersion of oleophilic nucleation sites can be any of the surfactants disclosed above with respect to the hydrocarbon-containing and hydrocarbon stabilizing surfactants. Additional hydrocarbon-containing surfactants include the nonionic and cationic surfactants, including the siloxane surfactants such as disclosed in U.S. Pat. No. 7,897,682 (Brothers et al.) and U.S. Pat. No. 7,977,438 (Brothers et al.).

The preferred water soluble hydrocarbon-containing compounds are the nucleant surfactants, and the preferred nucleant surfactants are the nonionic surfactants, especially the nonionic hydrocarbon surfactants. Accordingly, in the process of the present invention, when the above-described nucleation site forming step is used, the nucleant surfactant is preferably nonionic hydrocarbon surfactant, and the hydrocarbon stabilizing surfactant, whether passivated or unpassivated, is preferably anionic. The nucleant surfactant (and hydrocarbon-containing compound) is also preferably free of aromatic moiety. Nonionic hydrocarbon-containing surfactants and hydrocarbon-containing compounds containing alkylene oxide units are readily oxidizable by the polymerization initiator degradation agent.

Nonionic hydrocarbon nucleant surfactants include polyoxyethylene alkyl ethers, polyoxyethylene alkyl phenyl ethers, polyoxyethylene alkyl esters, sorbitan alkyl esters, polyoxyethylene sorbitan alkyl esters, glycerol esters, their derivatives and the like. More specifically examples of polyoxyethylene alkyl ethers are polyoxyethylene lauryl ether, polyoxyethylene cetyl ether, polyoxyethylene stearyl ether, polyoxyethylene oleyl ether, polyoxyethylene behenyl ether and the like; examples of polyoxyethylene alkyl phenyl ethers are polyoxyethylene nonyl phenyl ether, polyoxyethylene octyl phenyl ether and the like; examples of polyoxyethylene alkyl esters are polyethylene glycol monolaurylate, polyethylene glycol monooleate, polyethylene glycol monostearate and the like; examples of sorbitan alkyl esters are polyoxyethylene sorbitan monolaurylate, polyoxyethylene sorbitan monopalmitate, polyoxyethylene sorbitan monostearate, polyoxyethylene sorbitan monooleate and the like; examples of polyoxyethylene sorbitan alkyl esters are polyoxyethylene sorbitan monolaurylate, polyoxyethylene sorbitan monopalmitate, polyoxyethylene sorbitan monostearate and the like; and examples of glycerol esters are glycerol monomyristate, glycerol monostearate, glycerol monooleate and the like. Also examples of their derivatives are polyoxyethylene alkyl amine, polyoxyethylene alkyl phenyl-formaldehyde condensate, polyoxyethylene alkyl ether phosphate and the like. Particularly preferable are polyoxyethylene alkyl ethers and polyoxyethylene alkyl esters. Examples of such ethers and esters are those that have an HLB value of 10 to 18. More particularly there are polyoxyethylene lauryl ether (EO: 5 to 20. EO stands for an ethylene oxide unit.), polyethylene glycol monostearate (EO: 10 to 55) and polyethylene glycol monooleate (EO: 6 to 10).

Suitable nonionic hydrocarbon nucleant surfactants include octyl phenol ethoxylates such as the Triton® X series supplied by Dow Chemical Company:

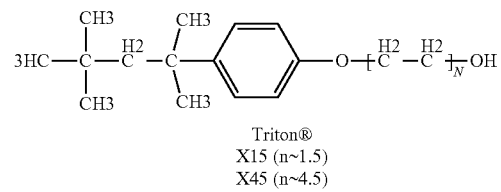

Triton®
X15 (n~1.5)
X45 (n~4.5)

Preferred nonionic hydrocarbon nucleant surfactants are branched alcohol ethoxylates such as the Tergitol® 15-S series supplied by Dow Chemical Company and branched secondary alcohol ethoxylates such as the Tergitol® TMN series also supplied by Dow Chemical Company:

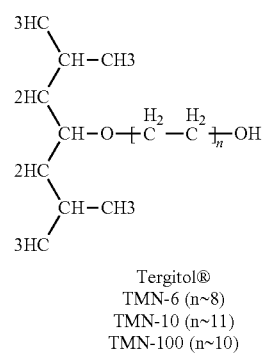

Tergitol®
TMN-6 (n~8)
TMN-10 (n~11)
TMN-100 (n~10)

Ethyleneoxide/propylene oxide copolymers such as the Tergitol® L series surfactant supplied by Dow Chemical Company are also useful as nonionic nucleant surfactants in this invention.

Yet another useful group of suitable nonionic hydrocarbon nucleant surfactants are difunctional block copolymers supplied as Pluronic® R series from BASF, such as:

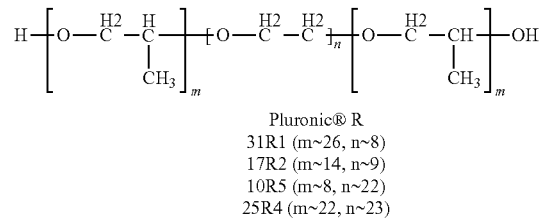

Pluronic® R
31R1 (m~26, n~8)
17R2 (m~14, n~9)
10R5 (m~8, n~22)
25R4 (m~22, n~23)

Another group of suitable nonionic hydrocarbon nucleant surfactants are tridecyl alcohol alkoxylates supplied as Iconol® TDA series from BASF Corporation.

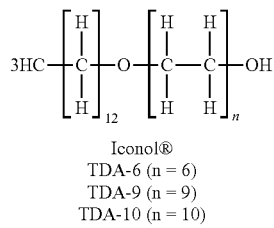

Iconol®
TDA-6 (n = 6)
TDA-9 (n = 9)
TDA-10 (n = 10)

Cationic surfactants can also be used as nucleant surfactants. A typical cationic surfactant has a positively charged hydrophilic portion such as an alkylated ammonium halide, such as alkylated ammonium bromide, and a hydrophobic portion such as a long chain fatty acid.

Another group of nucleant surfactants that can be used are the hydrocarbon-containing siloxane surfactants, preferably the hydrocarbon surfactants wherein the hydrocarbyl groups as described above, are entirely substituted with hydrogen atoms where they could be substituted by halogen such as fluorine, whereby these siloxane surfactants can also be considered as hydrocarbon surfactants, i.e. the monovalent substituents on the hydrocarbyl groups are hydrogen. Preferred as nucleant surfactants are the hydrocarbon siloxanes that have nonionic moieties, i.e., the nonionic hydrocarbon (siloxane) surfactants.

The degradation agent as the oxidizing agent for the nucleant surfactant in the preferred embodiment to form the oleophilic nucleation sites is preferably a water-soluble free radical polymerization initiator that is also useful for the polymerization of fluoromonomer. Polymerization initiators are not known to be harmful to the polymerization of fluoromonomers when used in the proper amount, whereby its introduction into the aqueous medium to cause the oxidation of the nucleant surfactant should not cause any problem in the subsequent polymerization reaction. Moreover, the amount of initiator used as the degradation agent is preferably small, yet effective to result in the desired oxidation of the hydrocarbon compound/surfactant to form the dispersion of oleophilic nucleation sites. The amount of initiator added to the aqueous polymerization medium is preferably insufficient to cause kickoff of the subsequent polymerization reaction. The same is true with respect to the amount of initiator remaining in the aqueous medium after oxidation of the nucleant surfactant to form the dispersion of oleophilic nucleation sites This avoids polymerization occurring during the initial pressuring up of the polymerization reactor with fluoromonomer, after which kickoff of the polymerization reaction occurs.

Additional free radical polymerization initiator is added to the aqueous medium in the pressured-up reactor to provide kickoff of the polymerization reaction. This would be the second addition of polymerization initiator to the aqueous polymerization medium If the degradation agent is polymerization initiator.

Examples of polymerization initiators that can be used as the degradation agent in the oleophilic nucleation forming step are those that will rapidly oxidize the hydrocarbon-containing compound, preferably nucleant, surfactant at the temperature of the aqueous medium achievable within the polymerization reactor to form the desired oleophilic nucleation sites. Rapid reaction is desired so that the resultant oleophilic nucleation sites, now existing in the aqueous medium that is essentially free of surfactant, can be available for the polymerization reaction as a dispersion. Preferred initiators for this purpose are the highly active water-soluble salts of inorganic initiators such as the inorganic peracids. Preferred initiators are the persulfate salts, e.g., ammonium persulfate or potassium persulfate. Preferred persulfate initiators are substantially free of metal ions and most preferably are ammonium salts. Additional initiators useful in the practice of this invention are water-soluble organic azo compounds such as azoamidine compounds.

The degradation agent can be the same as or different from the polymerization initiator used to polymerize the fluoromonomer. When the polymerization initiator is a mixture of initiators, for example, disuccinic acid peroxide and ammonium persulfate, the degradation agent is considered to be different from the polymerization initiator even if the degradation agent were ammonium persulfate The amount of degradation agent, preferably polymerization initiator, added as the degradation agent to the aqueous medium will depend on the molecular weight of the initiator used that preferably contains the peroxy —O—O— group. Too much initiator used as the degradation agent in the nucleation site forming step may cause destabilization of the nucleation sites along with premature polymerization of fluoromonomer pressuring up the reactor to kick off, resulting in larger fluoropolymer, fluoroplastic or perfluoroplastic particles being formed in the polymerization step. The amount of initiator is preferably less than the amount required to kickoff the polymerization reaction before it reaches operating pressure, preferably no greater than 50 ppm, more preferably no greater than 40 ppm, more preferably no greater than 30 ppm, even more preferably no greater than 20 ppm, and most preferably no greater than about 15 ppm. The minimum amount of initiator added to the aqueous medium can be as little as 1 ppm. The ppm amount of initiator present in the aqueous medium after formation of the dispersion of nucleation sites will be less than the ppm amounts disclosed herein as being added to the aqueous medium by virtue of the oxidation reaction causing degradation of the initiator. These ppm amounts are based on the weight of water present in the reactor at the time of forming the oleophilic nucleation sites as further described under the EXAMPLES.

A preferred embodiment of forming polymerization sites is wherein the oleophilic nucleation sites are either hydrocarbon-containing or hydrocarbon oleophilic nucleation sites, which are made by adding hydrocarbon-containing surfactant or hydrocarbon surfactant as the nucleant surfactant, each containing hydrophobic moiety and hydrophilic moiety, to the aqueous polymerization medium and exposing the surfactant to degradation, preferably oxidation, in the aqueous medium to degrade the hydrophilic moiety, thereby enabling the hydrophobic moiety to form the dispersion of hydrocarbon oleophilic nucleation sites. This nucleation site forming step is carried out prior to kickoff of the polymerization reaction according to the polymerization process of the present invention.

Preferably the amount of the nucleant surfactant added to the aqueous medium is no greater than 50 ppm, and such amount can be any of the lesser amounts mentioned above, selected so as not to be detrimental to the subsequent polymerization reaction.

Preferably, this degradation is carried out by adding degradation agent, which is preferably oxidizing agent, to the aqueous medium and reacting the agent with the nucleant surfactant in the aqueous medium, the amount of such agent being insufficient to cause the kickoff of the polymerizing of the fluoromonomer. Preferably, the degradation agent is also free radical polymerization initiator and the amount of degradation/oxidizing agent or initiator is no greater than 50 ppm.

Preferably, the formation of the dispersion of oleophilic nucleation sites as described above is accompanied by the additional step of adding water-soluble inorganic salt to the aqueous medium prior to the exposure of the hydrocarbon-containing compound, preferably, nucleant surfactant, to the degradation, preferably oxidation. At the time of the degradation, preferably oxidation, water-soluble inorganic salt is also present in the aqueous medium to aid the formation of the dispersion of oleophilic nucleation sites.

The effect of the water-soluble inorganic salt is to either (a) increase the number of oleophilic nucleation sites, thereby resulting in smaller fluoropolymer, fluoroplastic or perfluoroplastic particles and/or (b) enable the amount of oleophilic nucleation sites formed from hydrocarbon-containing compound/nucleant surfactant to be reduced for a given particle size. With respect to (a), this decrease in such particle size is with respect to a given small amount of compound/nucleant surfactant present in the degradation, preferably oxidation, reaction. With respect to (b), the desired number of sites can be obtained with a smaller amount of compound/nucleant surfactant to be present in the degradation, preferably oxidation, reaction, thereby reducing the possibility for the product of such reaction from inhibiting the subsequent polymerization reaction. The presence of the ions derived from the salt in aqueous solution provide the beneficial effect.

Examples of water-soluble inorganic salts that can act to aid in the nucleation site forming process include those containing alkali metal cations such as Na and K or $NH_4^+$ and anions such as $—SO_3$, $—HSO_3$, $—NO_3^-$, $-CL^-$, $—CO_3^-$, $—B_4O_7^-$, and $—HPO_4^-$. When the fluoropolymer, fluoroplastic, or perfluoroplastic being made by polymerization is to be fabricated by melt extrusion, the salt is preferably an ammonium salt.

The salt is selected such that it is effective to provide the beneficial effect mentioned above and neither deactivates the degradation agent, preferably initiator, thereby preventing the degradation, preferably oxidation, reaction from occurring, nor reacts with the initiator to prevent the initiator from reacting with the nucleant surfactant, nor inhibits the eventual polymerization. This enables a smaller amount of hydrocarbon-containing compound, preferably nucleant surfactant, to be used for forming the oleophilic nucleation sites than if no salt were used. This is especially important in the polymerization process for making the highest molecular weight perfluoroplastic, PTFE. The salt may be a reducing agent, but is not necessarily so. The carrying out of the degradation/oxidation reaction between the nucleant surfactant and the degradation agent, preferably initiator, in the presence of the water-soluble inorganic salt includes the possibility that the salt undergoes some transformation, such as a oxidation/reduction reaction, as well. It is apparent that the ionization of the salt in the aqueous medium has a positive effect on the formation of nucleation sites. If the amount of salt is too large, however, the result can be negative, i.e. a reduced number of nucleation sites and an increased polymer particle size. The amount of this water-soluble inorganic salt to be added to the aqueous medium is that which is effective to provide beneficial result. This amount is also small so as not to adversely affect the performance of the oleophilic nucleation sites or the subsequent polymerization reaction. The amount when this conversion of positive effect to negative effect depends primarily on the salt, but generally this conversion occurs at greater than 125 ppm salt, based on the weight of water in the reactor at the time of forming the nucleation sites, this basis being further described under EXAMPLES.

Generally to provide benefit to the nucleation site forming process and not be detrimental either to it or subsequent polymerization of the fluoromonomer in Process 1 and Process 2, the amount of water-soluble inorganic salt present in the aqueous medium at the time of the oxidation reaction, is preferably no greater than 100 ppm, preferably no greater than 75 ppm, even more preferably no greater than 50 ppm, and most preferably, no greater than 25 ppm, and preferably when used, at least 1 ppm, based on the weight of water in the reactor at the time of forming the oleophilic nucleation sites as further described under the EXAMPLES.

In the oleophilic nucleation site-forming process implemented prior to polymerization kickoff, each of these amounts of water soluble hydrocarbon-containing compound/nucleant surfactant, water-soluble inorganic salt, and degradation agent, preferably initiator, mentioned above can be used in any combination of the amounts mentioned. By way of example:

(a) use of no greater than 40 ppm of the compound/nucleant surfactant can be accompanied by any of the following amounts of water soluble inorganic salts (no greater than 125 ppm, 100 ppm, 75, ppm, 50 ppm, or 25 ppm), together with any of the following amounts of degradation agent/initiator (no greater than 50 ppm, 40 ppm, 30 ppm 20 ppm, or 15 ppm);

(b) use of no greater than 100 ppm of the water-soluble inorganic salt can be accompanied by any of the following amounts of the compound/nucleant surfactant (no greater than 50 ppm, 40 ppm, 30 ppm, or 20 ppm), together with any of the following amounts of degradation agent/initiator (no greater than 50 ppm, 40 ppm, 30 ppm 20 ppm, or 15 ppm); and (c) use of no greater than 30 ppm degradation agent/initiator can be accompanied by any of the following amounts of compound/nucleant surfactant (no greater than 50 ppm, 40 ppm, 30 ppm, or 20 ppm), together with any of the following amounts of water-soluble inorganic salt (no greater than 125 ppm, 100 ppm, 75, ppm, 50 ppm, or 25 ppm), etc.

It is also preferred that essentially no reactive fluoromonomer be present in the reactor at least at the commencement of the nucleation site forming step and the concomitant formation of the dispersion of oleophilic nucleation sites, i.e. the formation of these sites is preferably in the absence of fluoromonomer that may preferentially react with the small amount of degradation agent/initiator used as the degradation, preferably oxidizing, agent.

In a typical process for forming the dispersion of oleophilic nucleation sites, the reactor is charged with deionized and deaerated water. The oleophilic nucleation sites can conveniently be formed in-situ within this aqueous medium charged to the reactor by adding hydrocarbon-containing compound, preferably nucleant surfactant, to the aqueous charge in the small amount desired. Preferably, water-soluble inorganic salt is also added to this aqueous charge and these two compounds are mixed together. The hydrocarbon-containing compound/nucleant surfactant can conveniently be converted to the oleophilic nucleation sites by degradation, preferably oxidizing, the compound/nucleant surfactant in the aqueous medium in the reactor and in the presence of the water-soluble salt. The degradation agent can conveniently be the small amount of water-soluble polymerization initiator added to the aqueous medium. The temperature of the aqueous medium will be at the temperature effective to cause the degradation reaction, which is preferably an oxidizing reaction, to occur and will generally be from 25 to 120° C., preferably 40 to 120° C., more preferably from 50 to 120° C., even more preferably 60 to 120° C., and most preferably from 70 to 120° C., and this temperature can be the same or similar temperature at which the subsequent polymerization is carried out. The temperature used will primarily depend on the temperature desired for the later polymerization step, which temperature will also be high enough for the degradation agent/initiator to become reactive. The degradation, preferably oxidation, reaction is carried out sufficiently to degrade the hydrophilic moiety of the nucleant surfactant to enable the residue of the oxidized compound to become oleophilic nucleation sites. The oleophilic nucleation sites although oleophilic are invisible in the aqueous medium. The formation of the dispersion of nucleation sites commences with the start of the degradation, preferably oxidation reaction. It is contemplated that this reaction may continue as the reactor is pressured up with fluoromonomer added to the reactor to achieve the reactor pressure desired for kickoff. Thereafter, the polymerization step of the process of the present invention is carried out, comprising pressuring up the reactor with the fluoromonomer to be polymerized, followed by initiator initiated kickoff of the polymerization reaction essentially in the absence of water soluble hydrocarbon-containing compound, including hydrocarbon-containing surfactant, and delayed addition of hydrocarbon-containing, preferably hydrocarbon, stabilizing surfactant, and metering of the this surfactant into the aqueous medium during the subsequent polymerization reaction at the rates and time of injection mentioned above.

EXAMPLES

The following surfactants are used in the Examples. When used to form polymerization sites that are oleophilic nucleation sites, these surfactants are referred to in the Examples as nucleants or nucleant surfactants.

The Pluronic® 31R1 is nonionic and has the structure shown above, wherein both ends of the surfactant are hydrophobic and the center is hydrophilic.

Avanel® S-70 is an anionic surfactant containing ethylene oxide groups and having the structure shown above; Silwet® L7600 is a nonionic pendant-type polyethyleneoxide-modified polydimethylesiloxane available from GE Silicones.

Tergitol® 100 is a 70/30 wt % blend of TMN 6/TMN 10 identified earlier herein as members of the Tergitol® TMN series of surfactants, which are branched nonionic surfactants having the structure shown above.

CTMAB is cetyltrimethylammonium bromide ($CH_3(CH_2)_{15}N(CH_3)_3Br$), a cationic surfactant.

SDS is sodium dodecyl sulfate, a linear anionic hydrocarbon surfactant with no ethylene oxide groups.

SOS is sodium octyl sulfonate

Triton® X-100 is a nonionic surfactant, which is octyl phenol polyethoxy alcohol having the structure shown above.

The wax used in the Examples is a paraffin wax.

Fluoropolymer, fluoroplastic, and perfluoroplastic particle sizes are of the raw dispersion of polymer particles as measured using laser light scattering with a Zetasizer Nano-ZS manufactured by Malvern Instruments. Samples for analysis are prepared in 10×10×45 mm polystyrene cuvettes, capped and placed in the device for analysis. Preparation of the sample is as follows. Water used to flush the cuvette and used to dilute the dispersion sample is rendered substantially free of particles by drawing deionized, deaerated water into a 10 cc glass hypodermic syringe with locking tip. A Whatman® 0.02 micron filter (Cat. No. 6809-2002) is fitted to the locking tip of the syringe and pressure is applied force water through the filter and into the cuvette. Approximately 1.5 ml of water is placed in the cuvette, the cuvette is capped, shaken and uncapped. Water is poured out of the cuvette thus assuring the cuvette is free of polymer. Approximately 2.5 gm of filtered water is placed in the cuvette. One drop of the polymer particle dispersion to be analyzed is added to the cuvette. The cuvette is capped and shaken to completely mix the fluoropolymer particles in the water. The sample is placed in the Nano-ZS for determination of Dv(50). Dv(50) is the median particle size based on volumetric particle size distribution, i.e. the particle size below which 50% of the volume of the population resides.

Melt flow rate (MFR) is determined using the procedure of ASTM D 1228 and melt temperature and plastometer piston weight conditions that are standard for the polymer as indicated in the ASTM procedure for the particular polymer.

Melting temperature is measured by Differential Scanning calorimeter (DSC) according to the procedure of ASTM D 4591. The PTFE DSC melting temperature is obtained from the first time the polymer is heated above the melting temperature, also referred to as the first heat, in accordance with ASTM D-4591-87. The melting temperature reported is the peak temperature of the endotherm on first melting.

The term nucleant used herein refers to the surfactant from which the oleophilic nucleation sites are obtained by degradation, preferably oxidation, of the surfactant in an aqueous medium.

Unless otherwise indicated, the definition (calculation) of ppm herein is the weight of the ingredient divided by the weight of water present in the reactor at the time of the event when the concentration in ppm is being determined. Ppm of water soluble hydrocarbon-containing compound/nucleant surfactant, salt, if any, and degradation agent/initiator in the precharge composition described above and in the Examples is based on the weight of water initially charged to the reactor and any additional water charged containing each of the compound/nucleant surfactant, salt, if present, and degradation agent/initiator ingredients. Thus, the amount of water present in the reactor at the time of forming the oleophilic nucleation sites is the weight of water on which the ppm of the compound/nucleant surfactant, salt, if any, and degradation agent/initiator is determined. This amount will not include water added as solvent for the initiator added to the aqueous medium to provide for kickoff of the polymerization reaction or for addition of stabilizing surfactant to the aqueous medium. This amount of added water would be included in the ppm calculation of any surfactant present in the aqueous medium at the time of polymerization kickoff. For simplicity, when the water added contains a dissolved ingredient, such as compound/nucleant surfactant, salt, degradation agent/initiator, the resultant solution is considered to be entirely of water for purposes of ppm calculation. An exception to this way of determining ppm is the determination of the concentration of stabilizing surfactant based on the total weight of fluoropolymer, fluoroplastic, or perfluoroplastic particles present in the dispersion upon completion of the polymerization reaction, as described in EXAMPLE 10.

The disclosure of numerical amounts as "no greater than" and the like herein has the same meaning as the same numerical amounts being designated as being particular amounts or less. Thus, no greater than 50 ppm has the same meaning as 50 ppm or less. Similarly, the disclosure of numerical amounts of "at least" and the like herein has the same meaning as the same numerical amounts being designated as being particular amounts or greater. Thus, at least 45 wt % has the same meaning as 45 wt % or greater.

The reactor pressures disclosed herein are absolute pressures unless otherwise indicated as being gauge pressures (psig). The MPa and KPa pressures disclosed as corresponding to the psig gauge pressures are absolute pressures.

Batch time is the polymerization time from kickoff until completion of the polymerization reaction.

Wt % coagulum is calculated by the following formula: wt % coagulum=[wt of coagulum/total polymer produced]× 100. Total polymer produced is the combined weight of the coagulum and the dispersed fluoropolymer particles. All weights are measure of dry polymer.

Example 1

This Example contains experiments of polymerization with delayed addition of the hydrocarbon surfactant and its metering into the polymerization reactor and improvements obtained when the kickoff of the polymerization reaction is preceded by the formation of a dispersion of oleophilic nucleation sites, with and without the presence of salt.

General procedure for polymerization with no nucleation site formation step prior to polymerization kickoff: To a 12 liter, horizontally disposed, jacketed, stainless steel reactor with a two blade agitator is added 5700 gm of deionized, deaerated water and 250 gm of liquid wax. The reactor is sealed and placed under vacuum. The reactor pressure is raised to 30 psig (310 kPa) with nitrogen and brought to vacuum 3 times. Reactor agitator is set at 65 RPM. The reactor is heated to 90° C. and TFE is charged to the reactor to bring the reactor pressure to 400 psig (2.86 MPa). At time zero, 150 ml of initiator solution of deionized, deaerated water containing 0.05 gm of ammonium persulfate (APS) and 3.5 gm of disuccinic acid peroxide (DSP) is injected at 80 ml/min. Kickoff time ("KO Time" in Table A) is measured as the time (since time zero) necessary to drop 10 psi (69 kPa) from the maximum pressure observed during injection of the charge initiator solution. At kickoff, reactor pressure is brought back to 400 psig (2.86 MPa) with TFE and maintained at that pressure for the duration of the polymerization. After 100 gm of TFE is fed since kickoff, a stabilizer surfactant solution is pumped to the reactor at the rate of 4 ml/min, which corresponds to a surfactant metering rate of 0.28 g/l-hr. This delay in commencing the surfactant addition to the aqueous medium corresponds to a PTFE concentration in the aqueous medium of 1.68 wt % before this addition begins (calculation: 100 gm TFE÷[100+5700+ 150]×100). Preparation of the stabilizer solution is given below. After 750 gm of TFE has been added to the reactor since kickoff, the Batch Time (Table A) is recorded, the agitator is stopped, the reactor is vented to atmospheric pressure and the dispersion is discharged. Upon cooling, wax is separated from the dispersion. The PTFE dispersion has a pH of 2.8, % solids of 11.75 and Dv(50) of 198 nanometers (Experiment A-1 in Table A). The PTFE has a high molecular weight as indicated by DSC melting temperature of 332° C. (1st heating) and DSC heats of fusion of 76 J/g (1st heating) vs. 47.5 J/g ($2^{nd}$ heating), reflecting the extremely high melt viscosity of the PTFE reducing ability of the PTFE to recrystallize upon cooling after first heating.

The surfactant in the surfactant stabilizing solution used in the above procedure is passivated by the following procedure: In a 1 liter, jacketed round bottom flask is added 681.74 gm of deionized, deaerated water, 10.5 gm of sodium dodecyl sulfate (ACS Reagent, >99.0%) and 0.315 gm of Iron(II) sulfate heptahydrate. The contents are agitated until all solids are dissolved. The solution pH is adjusted to 2.0-2.5 with 12 to 14 drops of concentrated sulfuric acid. 37.34 gm of 30 wt % hydrogen peroxide aqueous solution is slowly added to the agitating mixture. Agitation continues for 1 hr at room temperature (22-23° C.) after which time the resultant oxidized surfactant in aqueous solution is used in the above polymerization procedure.

The above polymerization procedure has no nucleation step prior to polymerization kickoff, and the polymerization result is reported as A-1 in Table A.

The nucleation step is practiced by repeating the above polymerization procedure except that 5200 gm of deionized, deaerated water and 250 gm of liquid wax is the initial charge to the reactor. Then, 500 gm of deionized, deaerated water containing 0.085 gm of surfactant (Nucleant, Table A) and 0.4 gm of sodium sulfite water-soluble inorganic salt is added to the reactor. After heating the reactor to polymerization temperature but before charging TFE to bring the reactor to operating pressure, 50 ml of an aqueous solution containing 0.5 gm of APS per liter of deionized, deaerated water is added. The APS is the degradation agent for the oxidation of the nucleant surfactant. The surfactant concentration is 14.8 ppm (calculation: [0.085÷5750]×$10^6$), the salt concentration is 70 ppm, and the initiator concentration is 4.3 ppm. Under the conditions/additives present in the aqueous medium (precharge composition), the APS causes an oxidation reaction of the hydrocarbon surfactant to occur, resulting in the formation of oleophilic nucleation sites dispersed in the aqueous medium. The presence of these sites is indicated by the smaller particle size (Dv(50)) of the PTFE particles reported in Table A for Experiments A-3 through A-9, using nonionic, anionic, and cationic surfactants. The long time to polymerization kickoff for Experiment A-9 is attributed to the aromatic moiety present in this surfactant, the other surfactants used being non-aromatic, i.e. free of aromatic moiety. It is contemplated that this kickoff time can be reduced by reducing the amount of this surfactant used. The delay in this repeat experiment reported as Experiments A-3 to A-9 in Table A is 1.67 wt % fluoropolymer concentration before the stabilizing surfactant addition begins (calculation: 100 g TFE÷[100+5200+ 500+50+150]×100). The actual time of delay for all the experiments reported in Table A range from 4.4 to 6 min. after kickoff before the stabilizing surfactant addition begins.

Experiment A-2 is the result of the polymerization procedure described above in which no nucleant surfactant is present, except that the sodium sulfite salt is added in the amount shown in Table A. The presence of the salt and no nucleant surfactant results in a much larger PTFE particle size indicating that the salt is causing fewer polymer particles to be formed during the initial stage of polymerization.

TABLE A

| Exp. # | Nucleant Name | Na$_2$SO$_3$ ppm | KO Time min | Batch Time "B" min | Solids % | Dv(50)* nm | Particles Number | Polymer Made gm |
|---|---|---|---|---|---|---|---|---|
| A-1 | | | 4.3 | 37.9 | 11.75 | 198 (311) | 9.44E+16 | 829 |
| A-2 | | 70 | 2.4 | 45.4 | 12.06 | 358 (556) | 1.64E+16 | 853 |
| A-3 | Pluronic® 31R1 | 70 | 3.4 | 36 | 11.97 | 113 (176) | 5.20E+17 | 849 |
| A-4 | Avanel® S70 | 70 | 4.4 | 34.1 | 12.04 | 119 (184) | 4.51E+17 | 859 |
| A-5 | Silwet® L7600 | 70 | 2.8 | 30.1 | 11.97 | 130 (202) | 3.43E+17 | 852 |
| A-6 | Avanel® S74 | 70 | 3.4 | 33.2 | 12.18 | 134 (207) | 3.21E+17 | 874 |
| A-7 | Tergitol® 100 | 70 | 4.8 | 33.1 | 11.85 | 136 (213) | 2.94E+17 | 837 |
| A-8 | CTMAB | 70 | 3 | 36.8 | 11.84 | 160 (251) | 1.80E+17 | 833 |
| A-9 | Triton® X-100 | 70 | 20.9 | 44.4 | 11.82 | 154 (241) | 2.03E+17 | 838 |

*The Dv(50) values in parentheses are extrapolated from the measured Dv(50) value (no parentheses) using the equation presented below.

The above polymerizations are conducted as a screening series of polymerizations, i.e. carried out to dispersion PTFE solids (particles) content of about 11-13 wt %, based on total weight of the dispersion, resulting from the feed of just 750 gm of TFE after kickoff to the reactor for the polymerization reaction. The screening result available from the above polymerizations can be extrapolated to the polymerization result if the polymerization were extended to consume 3200 g of TFE to produce a dispersion solids content of about 34 wt %. This extrapolated result is reported in Table A as the Dv(50) in parenthesis This extrapolation can be done by using the following equation:

$$D2 = [P2 \times (D1)^3/P1]^{1/3}$$

wherein P1 is the actual amount of polymer produced (in grams) having the Dv(50) particle size D1 (in nanometers); P2 equals the projected polymer produced in grams, and D2 is the projected particle size (in nanometers) of the P2 polymer. Sample calculation for Experiment A-3:

$$D2 = (3200 \times 113 \times 113 \times 113/849)^{1/3} = (5438481.04)^{1/3} = 176$$

Experiment A-1 uses delayed addition of the surfactant and its metering as the polymerization reaction proceeds. Neither nucleant surfactant nor salt is used, i.e. the nucleation step procedure described above is not used. Experiment A-2 shows the disadvantage in just using the salt addition, without formation of nucleation sites, i.e. no nucleant surfactant is used. Experiment A-2 obtains a poorer result as a much larger Dv(50) particle size, much larger than for Experiment A-1. Comparison of the Dv(50) results of Experiment A-1 with Experiments A-3 to A-10 reveals the effect of the oleophilic nucleation sites present in Experiments A-3 to A-10 on providing a smaller fluoropolymer particle size. The batch time for experiment A-1 is comparable to the batch times for Experiments A-3 to A10, indicating that delayed addition of the stabilizing surfactant to the aqueous medium together with metering of subsequent additions of the surfactant to the aqueous medium is effective to reduce telogenicity of the hydrocarbon surfactant.

The above polymerization procedure is repeated in a series of experiments in which the nucleation step is included in the polymerization procedure along with varying the inorganic salt (Experiments B-1 to B-3), except that no salt is present in the nucleation site forming step in Experiment B-4. The nucleant surfactant is 14.8 ppm Pluronic® 31R1. The amount of salt adjuvant is 70 ppm and the amount of APS initiator is 4.3 ppm. The delay in commencing the stabilizing surfactant addition is 1.67 wt % PTFE concentration in the aqueous medium. The results are reported in Table B.

TABLE B

| Exp. # | Salt Name | Batch Time min | Dispersion solids % | Dv(50) nm | Particles Number | Polymer Made gm |
|---|---|---|---|---|---|---|
| B-1 | Na$_2$SO$_3$ | 33.1 | 11.81 | 118 | 4.404E+17 | 818 |
| B-2 | NaHSO$_3$ | 38.3 | 11.72 | 95.1 | 8.487E+17 | 826 |
| B-3 | Na$_2$S$_2$O$_5$ | 40.3 | 11.92 | 107 | 6.016E+17 | 833 |
| B-4 | — | 36.0 | 11.68 | 125 | 3.81E+17 | 842 |

As shown in Table B, different salts all provide small PTFE particle sizes. Experiment A-4 shows the Dv(50) result when nucleant surfactant, but no salt is used.

The PTFE made in all these polymerizations exhibits the characteristics described earlier in this Example.

Example 2

This Example provides the preparation of modified PTFE.

To a 12 liter, horizontally disposed, jacketed, stainless steel reactor with a two blade agitator is added 5200 gm of deionized, deaerated water and 250 gm of liquid wax. To the reactor is added an additional 500 gm of deionized, deaerated water which contains 0.02 gm of Pluronic® 31R1 and 0.4 gm of sodium sulfite. The reactor is sealed and placed under vacuum. The reactor pressure is raised to 30 psig (310 kPa) with nitrogen and vented to atmospheric pressure. The reactor is pressured with nitrogen and vented 2 more times. The agitator speed is set to 65 RPM and the reactor is heated to 90° C. 40 ml of initiator solution containing 0.5 gm of ammonium persulfate (APS) per liter of water is added to the reactor. This is the precharge composition. The concentrations of Pluronic surfactant, salt and initiator are 3.4 ppm, 69.6 ppm, a nd 3.5 ppm, respectively.

The reactor is pressured up by charging the reactor with 12.0 gm of hexafluoropropylene (HFP) and 650 gm of TFE to bring the reactor pressure to 400 psig (2.86 MPa). At time zero, 150 ml of an initiator solution composed of 11.67 gm of disuccinic acid peroxide solution (70 wt % DSP), 0.17 gm of ammonium persulfate and 488.3 gm of deionized, deaerated water is charged to the reactor at 80 ml/min. After 2.0 minutes from the start of initiator injection the reactor pressure drops 10 psi (69 kPa) from the maximum pressure observed during injection of the initiator solution. Reactor pressure is brought back to 400 psig (2.86 MPa) with TFE and maintained at that pressure for the duration of the polymerization. After 100 gm of TFE has been fed since kickoff, stabilizing surfactant solution (preparation described below) is pumped to the reactor at a rate of 4 ml/min (0.28 g/l-hr) until the end of the run. This delay in commencing the surfactant addition to the aqueous medium corresponds to 1.67 wt % concentration of modified PTFE in the aqueous medium. After 155.6 minutes since kickoff, 3100 gm of TFE and 688 ml of stabilizing surfactant solution has been added to the reactor. The agitator is stopped, the reactor is vented to atmospheric pressure and the dispersion is discharged. Upon cooling, liquid wax is separated from the dispersion and the dispersion is filtered to remove undispersed solids (coagulum). The reactor is opened and all coagulum is removed from the reactor. Reactor cleanout is combined with the filtered solids and dried in a vacuum oven. To get a measure of coagulum (total undispersed solids), liquid wax adhering to this polymer is further removed by centrifuging and blotting the polymer. Total coagulum is thus determined to be 120.4 gm. Total recovered liquid wax is 208.7 gm. The dispersed fluoropolymer particles constitute 32.8 wt % of the aqueous medium containing this dispersion. The dispersed particles have an average particle size by volume, Dv(50), of 255 nm. These particles are coagulated by diluting the dispersion to about 10 wt % solids and adding aqueous ammonium carbonate solution followed by vigorous agitation until the polymer particles fully separate from the water. The polymer is dried in a vacuum oven at 110° C. for 12 hours. Melting point of this polymer as measured by DSC on first heat is 335° C. Compositional analysis by FTIR gives 0.5 wt % HFP. This modified PTFE has a molecular weight (Mn) exceeding $10^6$ and a melt creep viscosity exceeding $10^6$ Pa·s.

The stabilizing surfactant solution is prepared as follows: In a 1 liter, jacketed round bottom flask is added 492.5 gm of deionized, deaerated water, 7.5 gm of sodium dodecyl sulfate (ACS Reagent, >99.0%) and 0.225 gm of Fe ($^{+2}$) sulfate heptahydrate. The contents are agitated until all solids are dissolved. The solution pH is adjusted to 3.22 with two drops of concentrated Sulfuric Acid. 18.75 gm of 30 wt % hydrogen peroxide is added to the mixture. The mixture is heated to 40° C. while stirring and held at temperature for 2 hours. The solution is discharged and cooled in an ice bath to rapidly bring the fluid to ambient temperature. The final mixture has a pH of 2.76.

Example 3

This Example provides the preparation of PFA.

To a 12 liter, horizontally disposed, jacketed, stainless steel reactor with a two blade agitator is added 7500 gm of deionized, deaerated water. To the reactor is added an additional 500 gm of deionized, deaerated water which contains 0.025 gm of Pluronic® 31R1 and 0.2 gm of sodium sulfite. The reactor is sealed and placed under vacuum. The reactor pressure is raised to 30 psig (310 kPa) with nitrogen and evacuated three times. Agitation is begun and the agitator speed is set to 70 RPM. 100 ml of PPVE and 0.1 gm of ethane is added to the reactor. 15 ml of initiator solution containing 6.2 gm ammonium persulfate per liter of deionized deaerated water is added to the reactor. The concentrations of surfactant, salt and initiator are 3.1 ppm, 25 ppm and 11.6 ppm, respectively. The reactor is heated to 85° C. and then TFE (approximately 290 gm) is charged to the reactor to bring the reactor pressure to 300 psig (2.17 MPa). At time zero, 100 ml of initiator solution is charged to the reactor at 80 ml/min and then the initiator is pumped continuously at 0.6 ml/min until the end of the run. Kickoff occurs after 1.5 minutes from the start of initiator injection when the reactor pressure drops 10 psi (69 kPa) from the maximum pressure observed during injection of the initiator solution. At kickoff, the reactor temperature controller setpoint is reduced from 85° C. to 75° C. Reactor pressure is controlled at 300 psig (2.17 MPa) with addition of TFE and 0.03 ml PPVE per gram of TFE fed for the duration of the polymerization. After 1000 gm of TFE has been fed since kickoff, a surfactant solution in deionized, deaerated water containing 0.5 gm of sodium dodecyl sulfate (SDS) per 100 g of deionized, deaerated water as the stabilizing surfactant is pumped into the reactor at a rate of 1 ml/min until the end of the run. This delay in commencing the addition of stabilizing surfactant to the aqueous medium corresponds to 11.6 wt % concentration of PFA in the aqueous medium as calculated below. The time delay is 50 min. The metering rate of the stabilizing surfactant is 0.025 g/l-hr. After 135 minutes since kickoff, 2300 gm of TFE and 86 ml of surfactant solution have been added to the reactor. The agitator is stopped, the reactor is vented to atmospheric pressure and the dispersion is discharged. 10.68 kg of PFA aqueous dispersion is produced with 22.1 wt % solids content in the aqueous medium and 114 nm raw dispersion particle size. Coagulum obtained from filtering the dispersion through cheesecloth and from cleaning the reactor is dried in a vacuum oven and measures 63 gm (0.6 wt %). PFA Polymer is isolated by freezing a dispersion sample followed by thawing, filtration, washing and drying. The polymer contains 6.0 wt % PPVE as measured by FTIR and has a MFR of 10.8 gm/10 min.

Calculation of wt % (fluoropolymer) conc. in aqueous medium:
A=total weight of polymer produced
B=total weight of water in reactor
A=wt TFE fed/(1−weight fraction of PPVE in fluoropolymer)
A=1000/(1−0.06)=1063.8
B=total weight of water added to reactor
B=7500+500+15+100+(0.6×50)=8145

$$\text{Wt \% concentration} = [A/(A+B)] \times 100$$
$$= [1063.8/(1063.8+8145)] \times 100 = 11.6$$

This experiment is repeated except for the following: Rather than adding 15 ml of initiator solution before heating the reactor to 85° C., the initiator solution is added after heating the reactor and before TFE is charged in order to bring the reactor to 300 psig (2.17 MPa). Kickoff time is 2.6 minutes, batch time is 138 minutes and 89 ml of surfactant solution is added to the reactor. 10.52 kg of aqueous dispersion is produced with 22.0 wt % solids content and 128 nm raw dispersion particle size. Coagulum obtained from filtering the dispersion through cheesecloth and from cleaning the reactor is dried in a vacuum oven and measures 95 gm. The isolated polymer contains 5.4 wt % PPVE as measured by FTIR and has a MFR of 12.0 gm/10 min. The delay in commencing the addition of the stabilizing surfactant to the aqueous medium is 49.5 min and corresponds to a PFA concentration of 11.5 wt %.

Example 4

The Example provides the preparation of FEP.

To a 12 liter, horizontally disposed, jacketed, stainless steel reactor with a two blade agitator is added 6000 gm of deionized, deaerated water. To the reactor is added an additional 500 gm of deionized, deaerated water which contains 0.015 gm of Pluronic® 31R1 and 0.1 gm of sodium sulfite. The reactor is sealed and placed under vacuum. The reactor pressure is raised to 30 psig (310 kPa) with nitrogen and evacuated three times. Agitation is begun and the agitator speed is set to 75 RPM. The reactor is heated to 95° C. 2.6 ml of initiator solution containing 22 gm ammonium persulfate per liter of deionized, deaerated water is added to the reactor. The concentrations of surfactant, salt and initiator are 2.3 ppm, 15.4 ppm, and 8.8 ppm, respectively.

HFP and TFE are charged to the reactor in a weight ratio of 1.857/1 HFP/TFE in order to bring the reactor pressure to 435 psig (3.10 MPa). At time zero, 30 ml of the above initiator solution is charged to the reactor at 80 ml/min and then the initiator is continuously pumped at 1.5 ml/min until the end of the run. Kickoff occurs after 3.5 minutes from the start of initiator injection when the reactor pressure drops to 425 psig (3.03 MPa). For the duration of the run, reactor pressure is controlled at 425 psig (3.03 MPa) with addition of TFE. After 300 gm of TFE has been fed since kickoff, a surfactant solution containing 1.45 gm of passivated sodium dodecyl sulfate per 100 gm of solution is pumped to the reactor at a rate of 0.75 ml/min until the end of the run. The delay in commencing the addition of stabilizing surfactant to the aqueous medium is 37.5 min and corresponds to an FEP concentration in the aqueous medium of 4.9 wt %. The metering rate of the surfactant into the aqueous medium is 0.054 g/l-hr. The passivation treatment of the stabilizing surfactant (SDS) is the same as set forth in Example 1. After 248 minutes since kickoff, 2000 gm of TFE and 158 ml of surfactant solution has been added to the reactor. The agitator is stopped, the reactor is vented to atmospheric pressure and the dispersion is discharged. 8.70 kg of aqueous dispersion is produced with 23.2 wt % solids content and 165 nm raw dispersion particle size. Coagulum obtained from filtering the dispersion through cheesecloth and from cleaning the reactor is dried in a vacuum oven and measures 270 gm. Polymer is isolated by freezing a dispersion sample followed by thawing, filtration, washing and drying. The polymer contains 10.6 wt % HFP as measured by FTIR and has a melting point of 273° C.

Example 5

This Example compares polymerization results for preparing PTFE having the characteristics of the PTFE of Example 1 by using different delays after polymerization kickoff, for introducing the stabilizing surfactant into the aqueous polymerization medium.

A summary of the polymerization conditions is as follows: 5700 gm of deionized, deaerated water is charged to the reactor with 0.085 gm of Pluronic® 31R1, 0.02 gm of Triton X-100 and 0.4 gm of $Na_2SO_3$ and heated to 90° C. Then, 80 ml (0.04 gm APS) is added to the aqueous medium. The concentrations of surfactants are in the aqueous medium 14.7 ppm and 3.4 ppm, respectively, and the concentration of salt is 69 ppm and of the initiator is 6.9 ppm. The reactor is pressured to 400 psig (2.86 MPa) with the addition of 660 gm of TFE. For initiating the polymerization, 150 ml of an initiator solution containing 0.33 gm APS and 22.33 g (70% active DSP) per liter of deionized, deaerated water is added to the reactor. After kickoff (KO) the pressure is maintained at 2.86 MPa with the addition of TFE. At 22 gm TFE feed (Experiments C-3 and C-4) or 300 gm TFE feed (Experiments C-1 and C-2, the introduction of the SDS or SOS stabilizing surfactants into the aqueous polymerization medium is begun. The delay of 22 gm of TFE being consumed before surfactant addition is commenced corresponds to a PTFE concentration in the aqueous medium of 0.37 wt %. The delay of 300 gm of TFE being consumed before surfactant addition is commenced corresponds to a PTFE concentration in the aqueous medium of 5.06 wt %. Stabilizer surfactant solution is pumped into the aqueous medium at a rate of 2 ml/min until 1000 gm of TFE feed. This pumping rate is a metering rate of 0.14 g/l-hr. Then, the pump rate is raised to 3 ml/min (0.22 g/l-hr). The concentration of SDS or SOS in the pump solution is 1.445 gm per 100 gm of fluid.

TABLE C

| Exp. | Stabilizer ppm | Stabilizer Type | Start Stabilizer gm TFE Fed | Stop Stabilizer gm TFE Fed | Batch Time min | Dv(50) nm | % solids % |
|---|---|---|---|---|---|---|---|
| C-1 | 898 | SDS | 300 | 2200 | 166 | 235 | 26 |
| C-2 | 1327 | SOS | 300 | 1760 | 464 | 196 | 2 |
| C-3 | 1327 | SDS | 22 | 968 | 464 | 146 | 18 |
| C-4 | 1327 | SOS | 22 | 1348 | 464 | 174 | 23 |

The results shown in this Table is that the delay of 22 gm (0.37 wt %) is too short for both SDS and SOS, as indicated by the long polymerization time of 464 min. This delay of 22 gm of TFE consumed before surfactant addition is commenced is the similar to the 0.36 wt % delay practiced in Example 1 of U.S. Pat. No. 7,521,513 making $VF_2$/HFP copolymer (calculation: [90÷(25000+100+90)×100]. Upon reaching the batch time of 464 min, the polymerization reaction is stopped, without the TFE monomer feed ever reaching the 2200 gm PTFE goal. Experiment C-1 provides the best result, enabling the 2200 gm goal to be met in a much shorter batch time than Experiments C-2 through C-4.

The above polymerizations are repeated with the following changes: the initiator pump rate is faster (4.0 ml/min.), and the delay in stabilizer surfactant feed is until 100 gm of TFE makeup feed to the reactor after kickoff, This delay corresponds to a PTFE concentration in the aqueous medium of 1.66 wt %. These changes in the repetition of the polymerizations are undertaken in recognition of the benefit (reduced telogenicity) of the stabilizing surfactant being passivated as described below. Pumping continues to the end of the run. The results are shown in Table D.

The SDS and SOS stabilizing surfactants are passivated prior to introduction into the aqueous polymerization medium according to the following procedure:

Into a 1 L glass bottle, 10.5 gm of sodium dodecyl sulfate is added to 681.74 gm of deaerated water and further stirred using stir bar until all solids are dissolved and the solution is clear. 0.315 gm of iron ($^{+2}$) sulfate heptahydrate is added to this solution at room temperature. The pH is then adjusted to 2.0-2.5 with 12-14 drops of conc. $H_2SO_4$. The contents of this bottle are transferred to a 3-necked 1 L glass reactor that has a heating/cooling jacket equipped with thermometer and an overhead stirrer. 37.34 gm of $H_2O_2$ (30% solution) are then added slowly to this stirred solution. The solution is then further stirred at room temperature for 60 additional minutes after completion of the $H_2O_2$ addition. The solution containing the resultant passivated SDS reaction is then discharged into 1 L glass bottle, and this is the solution used for pumping stabilizing surfactant into the polymerization reaction. The same passivation procedure is used for SOS, except that it is added to the IL glass bottle as a solution in water, available as Witconate® NAS-8 surfactant, to provide the same 10.5 gm of SOS.

TABLE D

| Example | Stabilizer ppm | Stabilizer Type | Start Stabilizer gm TFE Feed | TFE Makeup gm | Batch Time min | Dv(50) nm | % solids % |
|---|---|---|---|---|---|---|---|
| D-1 | 922 | SDS | 100 | 3100 | 110 | 188 | 34 |
| D-2 | 1127 | SOS | 100 | 3100 | 134 | 194 | 16 |

The passivation of the SDS and SOS stabilizing surfactants results in much shorter batch times to make a greater amount of PTFE.

Example 6

The Example compares polymerization results from stabilizing surfactant passivated at different temperatures. The passivation procedure is as follows: In a 1 liter, jacketed round bottom flask is added 681.74 gm of deionized, deaerated water, 10.5 gm of sodium dodecyl sulfate (ACS Reagent, >99.0%) and 0.315 gm of $Fe(^{+2})$ sulfate heptahydrate. The contents are agitated until all solids are dissolved. The solution pH is adjusted to 2.0-2.5 with 12-18 drops of concentrated sulfuric acid. While holding the mixture at the desired passivating temperature as shown for Experiments F-1, F-2, and F-3 in Table F by circulating thermally regulated water through the flask jacket, 37.34 gm of 30 wt % hydrogen peroxide is added to the mixture. The mixture is agitated for 1 hour before being discharged and as necessary rapidly cooled to room temperature using an ice bath.

The polymerization procedure is as follows: To a 12 liter, horizontally disposed, jacketed, stainless steel reactor with a two-blade agitator is added 5200 gm of deionized, deaerated water and 250 gm of liquid wax. To the reactor is added an additional 500 gm of deionized, deaerated water which contains 0.085 gm of Pluronic® 31R1, 0.02 gm of Triton® X-100 and 0.4 gm of sodium sulfite. The reactor is sealed and placed under vacuum. The reactor pressure is raised to 30 psig (310 kPa) with nitrogen and brought to vacuum 3 times. The agitator speed is set to 65 RPM and the reactor is heated to 90° C. 0.04 g APS initiator is next charged to the heated aqueous medium (80 ml of 0.5 g/l initiator solution in deionized, deaerated water) to provide an APS concentration in the precharge of 6.9 ppm. The surfactant concentrations are 14.7 ppm and 3.5 ppm, respectively, and the salt concentration is 70 ppm in the aqueous medium. TFE is charged to the reactor to bring the reactor pressure to 400 psig (2.86 MPa). At time zero, 150 ml of an initiator solution composed of 11.67 gm of (70% active) disuccinic acid peroxide, 0.17 gm of ammonium persulfate (APS) and 488.3 gm of deionized, deaerated water is charged to the reactor at 80 m l/m in. Approximately 7 minutes from the start of initiator injection the reactor pressure drops 10 psi (69 kPa) from the maximum pressure observed during injection of the initiator solution. Reactor pressure is brought back to 400 psig (2.86 MPa) with makeup TFE and maintained at that pressure for the duration of the polymerization by continuous addition of makeup TFE. After 100 gm of TFE has been fed since kickoff, surfactant solution is pumped to the reactor at a rate of 4 ml/min until the end of the run. This delay in commencing addition of the stabilizing surfactant to the aqueous medium corresponds to a PTFE concentration in the aqueous medium of 1.66 wt %, and the metering rate of the surfactant into the aqueous medium is 0.29 g/l-hr. The batch time (time from kickoff to the end of makeup TFE addition) is shown in the table below. After 3100 gm of makeup TFE has been added to the reactor, the agitator is stopped, the reactor is vented to atmospheric pressure and the dispersion is discharged. Upon cooling, liquid wax is separated from the dispersion and the dispersion is filtered to remove undispersed solids. The reactor is opened and all adhered polymer removed from the reactor. Reactor cleanout is combined with the filtered solids and dried in a vacuum oven. To get a measure of coagulum (total undispersed solids) liquid wax adhering to this polymer is further removed by centrifuging and blotting the polymer. Coagulum thus obtained in these examples is 35-38 grams. Aqueous dispersion produced is 9.7 kg with 34% solids and an average particle size by volume, Dv(50), as shown in the Table F below. Polymer is coagulated by diluting the dispersion to about 10 wt % solids and adding aqueous ammonium carbonate solution followed by vigorous agitation until the polymer fully separates from the water The polymer is dried in a vacuum oven at 110° C. for 12 hours. The PTFE exhibits the molecular weight and melt creep viscosity characteristics of the PTFE described in Example 2.

TABLE E

| Experiment | PT Temp. ° C. | Batch Time min. | Dv(50) nm |
|---|---|---|---|
| E-1 | 22 | 110.1 | 188 |
| E-2 | 30 | 109.2 | 176 |
| E-3 | 40 | 152.4 | 197 |

The batch time falls sharply from passivation of the stabilizing surfactant at 40° C. to passivation at lower temperatures.

Example 7

The Example compares polymerization performance using passivated and unpassivated stabilizing surfactant To a 12 liter, horizontally disposed, jacketed, stainless steel reactor with a two blade agitator is added 5200 gm of deionized, deaerated water and 250 gm of liquid wax. To the reactor is added an additional 500 gm of deionized, deaerated water which contains 0.075 gm of Pluronic® 31R1 and 0.2 gm of sodium sulfite. The reactor is sealed and placed under vacuum. The reactor pressure is raised to 30 psig (310 kPa) with nitrogen and brought to vacuum three times. Reactor agitator is set at 65 RPM. The reactor is heated to 90° C. and 100 ml of initiator containing 0.5 gm APS per liter of deionized, deaerated water is added to the reactor, providing an APS concentration of 8.6 ppm in the precharge composition. The concentration of the surfactant in the aqueous medium is 12.9 ppm and of the salt is 34.5 ppm.

690 gm of TFE is added to the reactor to bring the reactor pressure to 400 psig (2.86 MPa). At time zero, 150 ml of initiator solution containing 0.5 gm APS per liter of deionized deaerated water is charged to the reactor at 80 ml/min and then the pump rate is reduced to 1.0 ml/min for the duration of the polymerization. Kickoff is measured as the time (since time zero) necessary to drop 10 psi (69 kPa) from the maximum pressure observed during injection of the charge initiator solution. Kickoff occurs in 2 minutes and the reactor pressure is brought back to 400 psig (2.86 MPa) with makeup TFE and maintained at that pressure for the duration of the polymerization by continuous addition of makeup TFE. After 300 gm of makeup TFE has been added to the reactor, a pump solution containing 8.0 gm of sodium dodecyl sulfate per liter of water is added to the reactor at a rate of 2.0 ml/min until a total of 300 gm of solution has been added. The time delay between kickoff and commencement of the SDS addition is 9.3 min, the concentration of PTFE in the aqueous medium at the end of this time delay is 4.79 wt %, and the surfactant metering rate is 0.08 g/l-hr. After 197 minutes from time zero, 2200 gm of makeup TFE has been added to the reactor, the agitator is stopped, the reactor is vented to atmospheric pressure and the dispersion is discharged. Batch time is 195 min (calculation: 197 min-2 min). PTFE dispersion thus made has 28% solids and a raw dispersion particle size of 213 nm. A polymer sample is obtained by diluting a quantity of dispersion to approximately 10 wt % solids, adding an aqueous solution of ammonium carbonate and vigorously agitating to separate the polymer from the aqueous phase. Polymer is washed with deionized water and dried in a vacuum oven at 110° C. for approximately 12 hours before being further analyzed. The PTFE exhibits the molecular weight and melt creep viscosity characteristics of the PTFE as described in Example 2.

The above experiment is repeated except that after 300 gm of makeup TFE is added to the reactor, a pump solution containing 14.4 gm of passivated sodium dodecyl sulfate per liter of water is added to the reactor at a rate of 1.67 ml/min until the end of the run at which time 2200 gm of makeup TFE has been added to the reactor. The delay in commencing the addition of the passivated SDS to the aqueous medium is 9.7 min, the PTFE concentration at the end of the delay is 4.79 wt %, and the metering rate of the surfactant into the aqueous medium is 0.12 g/l-hr. Total quantity of passivated sodium dodecyl sulfate solution added is 115 ml. The batch time of 79 minutes is significantly less than the unpassivated experiment in the preceding paragraph. The dispersion measures 26.5% solids and has a raw dispersion particle size of 175 nm. The PTFE exhibits the molecular weight and melt creep viscosity characteristics of the PTFE as described in Example 2.

The passivation of the SDS is carried out by the following procedure: Into a 1 liter, jacketed round bottom flask is added 681.74 gm of deionized, deaerated water, 10.5 gm of sodium dodecyl sulfate (ACS Reagent, >99.0%) and 0.315 gm of iron($^{+2}$) sulfate heptahydrate. The contents are agitated until all solids are dissolved. The solution pH is adjusted to 2.0-2.5 with 12-18 drops of concentrated sulfuric acid. While holding the mixture at 22° C. by circulating thermally regulated water through the flask jacket, 37.34 gm of 30 wt % hydrogen peroxide is added to the mixture. The mixture is agitated for 1 hour before being discharged for use as the solution of passivated stabilizing surfactant in polymerization.

Example 8

This Example discloses the polymerization to make PTFE using an ethoxylated anionic surfactant as the stabilizing surfactant.

To a 12 liter, horizontally disposed, jacketed, stainless steel reactor with a two blade agitator is added 5200 gm of deionized, deaerated water and 250 gm of liquid wax. To the reactor is added an additional 500 gm of deionized, deaerated water which contains 0.085 gm of Pluronic® 31R1, 0.02 gm of Triton® X-100 and 0.4 gm of Na$_2$SO$_3$. The reactor is sealed and placed under vacuum. The reactor pressure is raised to 30 psig (310 kPa) with nitrogen and brought to vacuum three times. Reactor agitator is set at 65 RPM and the reactor is heated to 90° C. 80 ml of initiator solution containing 0.5 gm of ammonium persulfate (APS) per liter of deionized, deaerated water is added to the reactor, providing an APS concentration in the aqueous precharge of 6.9 ppm. The concentrations of the surfactants in the aqueous medium are 14.7 ppm and 3.5 ppm, respectively, and the salt concentration is 69.2 ppm. TFE is charged to the reactor to bring the reactor pressure to 400 psig (2.86 MPa). At time zero, 150 ml of an initiator solution in deionized, deaerated water containing 0.33 gm APS and 23.33 gm of 70 wt % active disuccinic acid peroxide (DSP) per liter of water is charged to the reactor at 80 ml/min. Kickoff time is measured as the time (since time zero) necessary to drop 10 psi (69 kPa) from the maximum pressure observed during injection of the initiator solution at time zero. Kickoff occurs in 6.8 minutes. The reactor pressure is brought back to 400 psig (2.86 MPa) with makeup TFE and maintained at that pressure by adjusting makeup TFE flow for the duration of the polymerization. After 100 gm of makeup TFE has been fed, a passivated stabilizing solution containing Avanel® S70 is pumped at a rate of 4 ml/min until the end of the run. The time delay in commencing the addition of stabilizing surfactant to the aqueous medium is 7.9 min, the wt % delay corresponds to a PTFE concentration in the aqueous medium of 1.66 wt %, and the metering rate of the surfactant into the aqueous medium is 0.288 g/l-hr. After 2200 gm of TFE has been added to the reactor since Time Zero, the agitator is stopped, the reactor is vented to atmospheric pressure and the dispersion is discharged. The resultant aqueous dispersion has 24.7% solids having an average particle size by volume, Dv(50), of 178 nm. Polymer is coagulated by diluting the dispersion to about 10 wt % solids and adding aqueous ammonium carbonate solution followed by vigorous agitation until the polymer fully separates from the water. The PTFE is dried in a vacuum oven at 110° C. for 12 hours, and it is determined to exhibit the molecular weight and melt creep viscosity characteristics of the PTFE of Example 2.

The procedure for passivating the Avanel® surfactant is as follows:

To a 1 liter glass bottle is added 30 gm of Avanel® S70 solution (10.5 gm active surfactant), 662.24 gm of deionized, deaerated water and 0.315 gm of iron(+2) sulfate heptahydrate. The mixture is stirred until all solids are dissolved. pH of this mixture is adjusted to 2.0-2.5 with 12 to 16 drops of concentrated sulfuric acid. While agitating and holding at 22-23° C., 37.34 gm of 30 wt % hydrogen peroxide is slowly added to the mixture over a period of 1 to 2 minutes. After addition of the hydrogen peroxide stirring is continued for 1 hour before the resulting passivated surfactant solution is used in the above polymerization.

Example 9

This Example discloses the polymerization to make PTFE using a variety of anionic hydrocarbon stabilizing surfactants.

To a 12 liter, horizontally disposed, jacketed, stainless steel reactor with a two blade agitator is added 5200 gm of deionized, deaerated water and 250 gm of liquid wax. To the reactor is added an additional 500 gm of deionized, deaerated water which contains 0.085 gm (14.7 ppm) of Pluronic® 31R1, and 0.4 gm (69 ppm) of sodium sulfite. The reactor is sealed and placed under vacuum. The reactor pressure is raised to 30 psig (310 kPa) with nitrogen and brought to vacuum 3 times. The agitator speed is set to 65 RPM and the reactor is heated to 90° C. 80 ml of a solution containing 0.5 gm of ammonium persulfate (APS) initiator per liter of water is added to the reactor, providing an APS concentration in the water added so far to the reactor of 6.9 ppm. This is the stage of the reaction wherein oleophilic nucleation sites are formed prior to kickoff of the polymerization reaction. The ppm of ingredients added to the aqueous medium stated above are based on the total amount of water present in the reactor up until this time.

TFE is next charged to the reactor to bring the reactor pressure to 400 psig (2.86 MPa). 150 ml of an initiator solution composed of 11.67 gm of (70% active) disuccinic acid peroxide, 0.17 gm of ammonium persulfate and 488.3 gm of deionized water is charged to the reactor at 80 ml/min. Kickoff of the polymerization reaction is considered to have occurred after a drop of 10 psi (69 kPa) from the maximum pressure observed during injection of the initiator solution. Reactor pressure is brought back to 400 psig (2.86 MPa) with makeup TFE and maintained at that pressure for the duration of the polymerization by continuous addition of makeup TFE. After 100 gm of TFE has been fed since kickoff, corresponding to a PTFE concentration of 2.49 wt % in the aqueous medium, an aqueous solution of surfactant and metal ions identified in Table F is pumped to the reactor at a rate of 4 ml/min (surfactant metering rate=0.288 g/l-hr) until the end of the run, i.e. until the addition of makeup TFE to the reactor is stopped. After the prescribed amount of makeup TFE has been added to the reactor, the TFE feed and agitator is stopped, this establishing the completion of the polymerization reaction. After venting of the reactor (removal of unreacted TFE), the polymer dispersion is discharged. Upon cooling, liquid wax is separated from the dispersion and the dispersion is filtered to remove undispersed solids. The reactor is opened and all adhered polymer removed from the reactor. Reactor cleanout is combined with the filtered solids and dried in a vacuum oven.

Coagulum (total undispersed solids) is obtained by further removing liquid wax from the dry filtered solids plus adhered polymer by centrifuging and blotting the polymer to remove wax. The polymer dispersion is coagulated by diluting the dispersion water to about 10 wt % solids and adding aqueous ammonium carbonate solution followed by vigorous agitation until the polymer fully separates from the water. The resultant polymer is dried in a vacuum oven at 110° C. for 12 hours. Melting point and heat of fusion of this polymer is determined by Differential Scanning calorimeter (DSC). The polymer is PTFE having a molecular weight (Mn) of at least 1,000,000.

The results of these experiments are reported in Table F below.

TABLE F

| Exp. # | Salt Conc. gm/L | Surf. | Surf. ppm on water | SALT | ppm cation on water* | Wt % cation on Surf. |
|---|---|---|---|---|---|---|
| F-1 | 0.432 | SDS | 627 | FeSO4—7H2O | 3.8 | 0.6032 |
| F-2 | 0.388 | SDS | 659 | CuSO4—5H2O | 4.5 | 0.6751 |
| F-3 | 0.432 | K8300 | 1098 | FeSO4—7H2O | 6.6 | 0.6031 |
| F-4 | 0.388 | S-74 | 1366 | CuSO4—5H2O | 9.4 | 0.6863 |
| F-5 | 0.388 | S-70 | 994 | CuSO4—5H2O | 6.8 | 0.6863 |

| Exp. # | Batch Time min | Dispersion % Solids | Dv(50) nm | Coag. % | STY gm/(L-hr) |
|---|---|---|---|---|---|
| F-1 | 72.9 | 27.48 | 183 | 1.66 | 162.8 |
| F-2 | 76.4 | 26.99 | 161 | 0.17 | 150.4 |
| F-3 | 125.9 | 26.67 | 199 | 2.52 | 92.9 |
| F-4 | 162.8 | 26.27 | 154 | 0.23 | 72.9 |
| F-5 | 118.3 | 26.33 | 153 | 3.26 | 94.8 | cation is the metal ion

The "Surf. ppm on water" is the total weight of stabilizing surfactant added to the total weight of water added to the polymerization reactor until completion of the polymerization reaction. The "ppm cation on water" is the weight ppm of the metal ion in the total amount of water added to the reactor until completion of the polymerization reaction. "Batch time" is measured as the time from polymerization kickoff to the completion of the polymerization reaction. The "Dispersion % Solids" is the wt % of the polymer particles dispersed in the aqueous medium as compared to the total weight of the dispersed polymer particles+the total weight of water present at completion of the polymerization reaction. STY (space-time-yield of the polymerization reaction is a measure of productivity of the polymerization reaction). In STY, space is the volume of the reactor, time is the time from kickoff of the polymerization reaction until its completion, and yield is the weight of dispersed polymer formed. STY is expressed herein as gm (of dispersed polymer)/l-hr.

All of the polymerizations reported in Table F produce small particles at the high % solids obtained, together with low % coagulum and good STY. The melting temperatures of the PTFEs produced all exceed 335° C. and the reduction in heats of fusion from the first heat to the second heat melting all exceed 29 J/gm.

The PTFEs obtained in the foregoing Examples all exhibit an MFR of 0 (ASTM D 1238 at 372° C. and 5 kg. wt.) as another indication of the non-melt flowability of these PTFEs because of their extremely high molecular weight.

Example 10

This Example discloses Aspects A, B, and C of an embodiment of the present invention directed to the preparation of high solids content aqueous dispersion of PTFE particles, i.e. solids contents of 45 wt % and greater than 45 wt %, preferably 50 wt % and greater than 50 wt %, more preferably 55 wt % and greater than 55 wt %, and up to 60 wt % or 65 wt % by polymerization, wherein the stabilizing surfactant is hydrocarbon surfactant. The disclosure hereinafter in this Example applies to each of these high solids contents. The "solids" in "solids contents" are the dispersed PTFE particles.

The practice of Aspect A of this embodiment involves the use of a much greater amount of hydrocarbon-containing surfactant, preferably hydrocarbon surfactant, metered to the aqueous medium for stabilizing the PTFE dispersion during the polymerization reaction. For example, the control experiment in Table G below uses 724 ppm total stabilizing surfactant concentration based on the total weight of dispersed PTFE particles to obtain a dispersion solids content in the aqueous medium of 33.9% (34 wt %). Aspect A uses more than 1.5× this amount, preferably at least 2× this amount, more preferably at least 3× this amount and most preferably at least 4× this amount, notwithstanding the warning in U.S. Pat. No. 3,000,892 to Duddington that "these dispersing agents [hydrocarbon dispersing agents] normally inhibit the polymerization of tetrafluoroethylene" (col. 1, 1. 65-66). Example II in '892 uses 2645 ppm of sodium lauryl sulfate (SDS) based on the total weight of PTFE present as dispersed particles to polymerize TFE to a PTFE dispersion in which the solids content reaches only 8.4 wt %.

Surprisingly, the use of a large amount of hydrocarbon-containing stabilizing surfactant in Aspect A is without appreciable loss in productivity of the reactor, which can be determined by space-time-yield (STY) of the polymerization reaction. Preferably the STY to produce the solids content of at least 45 wt % is at least 90% of the STY of the same polymerization process, except that the total amount of hydrocarbon-containing surfactant is smaller to provide the 34 wt % solids content. The use of a smaller amount of such surfactant to obtain 34 wt % (33-35 wt %) arises from the desire to minimize the amount of total surfactant so as to reduce telogenic effect on the polymerization reaction. More preferably, there is no decrease in such STY of the polymerization reaction. More preferred, and surprisingly, the STY is increased as compared to the aforesaid polymerization to obtain a solids content of 34 wt %, and this increase is preferably at least 5% more preferably, at least 10%.

The limitation on solids content of 8.4 wt % in Example II of '892 is the PTFE particle size of 0.23 micrometers obtained at this low solids content. This is a large particle size for so early in the particle growth stage represented by the solids content of only 8.4 wt %. The increase in particle size from 0.23 micrometers if the polymerization were driven to a higher solids content can be seen from information in the present application. Specifically, Experiment A-1 in Example 1 of the present application reports that the particle size of 198 nm at a solids content of 11.75 wt % grows to a 311 nm particle size if the polymerization were continued to 34 wt % solids content. Such a large particle size is undesirable because it reduces the stability of the dispersion of the particles, promoting the formation of coagulum. In contrast, the PTFE particle size of high solids content dispersions reported in Table G reveal much smaller PTFE particle sizes for the much higher solids contents of 45 wt % and higher.

It has been discovered that metering of the hydrocarbon-containing surfactant to the aqueous polymerization medium during polymerization to total a much greater amount of the surfactant enables the polymerization to be carried out to produce a stable dispersion having a substantially greater solids content, without any appreciable sacrifice in productivity as indicated by STY of the polymerization reaction. Accompanying this discovery is the additional surprise that the increased amount of hydrocarbon-containing stabilizing surfactant used in this embodiment of the present invention, while expected to inhibit the polymerization of TFE to make PTFE, does not inhibit such polymerization. The resultant PTFE forming the dispersed particles in the aqueous polymerization medium is of high molecular weight, i.e. having a molecular weight of at least 1,000,000, as indicated by non-melt flowability and DSC melting temperature (first heat) of at least 332° C.

Thus, Aspect A of the embodiment of this Example can be described as a process for polymerizing fluoromonomer to form a dispersion of fluoroplastic particles in an aqueous medium in a polymerization reactor, comprising steps (a), (b), (c) and (d) recited above, and further wherein the fluoroplastic is polytetrafluoroethylene and the polymerizing is carried out to wherein the dispersion of polytetrafluoroethylene particles constitute at least 45 wt % of the aqueous medium. The total amount of hydrocarbon-containing surfactant metered into the aqueous medium is preferably effective to provide this dispersion of at least 45 wt % of the aqueous medium.

As with lower solids contents dispersions of fluoroplastic particles made by polymerization in accordance with the present invention, the aqueous medium is essentially free of hydrocarbon-containing surfactant before the kicking off of the polymerization of the fluoromonomer, notwithstanding that hydrocarbon-containing nucleant surfactant may have been added to the aqueous medium to be oxidatively degraded to oleophilic nucleation sites prior to polymerization kickoff. Prior to polymerization kickoff, the aqueous medium is preferably also essentially free of halogen-containing surfactant and preferably no such surfactant is added to the polymerization medium during or after the kicking off of the polymerization reaction. The aqueous medium containing the dispersion of PTFE particles upon completion of the polymerization, i.e. as polymerized, is also preferably essentially free of halogen-containing surfactant, such as fluorosurfactant. More preferably, the aqueous medium is free of halogen-containing surfactant, meaning that no such surfactant has been added to the aqueous medium. The hydrocarbon-containing surfactant is essentially the only surfactant stabilizing the as-polymerized high solids content PTFE particle aqueous dispersion.

The disclosures under SUMMARY OF THE INVENTION and DETAILED DESCRIPTION OF THE INVENTION earlier in this patent application apply to the embodiment of this Example, which includes all of its Aspects. Thus, the description of the PTFE earlier in the present application in the section under Fluoromonomer/Fluoroplastic is applicable to the PTFE of this embodiment. The disclosure in the section under The Polymerization Process earlier herein is also applicable to this embodiment, including e.g. the delay after polymerization kickoff before the addition of the hydrocarbon stabilization surfactant is commenced, the metering rate of this addition, the identity of the hydrocarbon-containing surfactant, the polymerization initiators that are used, the coagulum amounts, with the following exceptions: the wt % PTFE solids contents are higher than those mentioned under The Polymerization Process and the concentration step of adding surfactant to the aqueous dispersion after polymerization is completed to enable the dispersion to be concentrated to higher solids contents is unnecessary. High solids contents are obtained directly by polymerization without the need for a concentration step such as disclosed in U.S. Pat. No. 3,037,953 (Marks and Whipple). The dispersion of PTFE particles in the aqueous medium is also preferably free of anionic polyelectrolyte disclosed in US2007/0282044A as being an alternative to the anionic surfactant added to the aqueous dispersion after polymerization to enable the dispersion to be concentrated according to '953. With high solids contents represented by solids content of 45 wt % and greater than 45 wt %, any coagulum formation is preferably very small, e.g. 2 wt % or less than 2 wt % and more preferably 1 wt % or less than 1 wt %. This is a surprising accomplishment, in that the higher the solids content of the aqueous dispersion, the greater is the tendency for coagulum wt % to also increase. The high solids PTFE dispersions of the embodiment of this Example can be obtained with very small coagulum wt % as shown in Table G.

The preferences disclosed in each of these sections under The Polymerization Process are also applicable to the embodiment of this Example. Also applicable to this embodiment is passivation of the hydrocarbon-containing surfactant disclosed under Passivation of the Hydrocarbon-Containing Surfactant, including the preferences disclosed thereunder.

Also applicable to the embodiment of this Example is the formation of polymerization sites in the aqueous medium prior to polymerization kickoff as disclosed under Polymerization Sites, including the preferences disclosed thereunder. The preference for the formation of polymerization sites that are oleophilic nucleation sites includes the addition of a small amount of hydrocarbon-containing surfactant (nucleant surfactant) to the aqueous medium, preferably no greater than 50 ppm of the nucleant surfactant) to be subjected to oxidative degradation, leaving the aqueous medium essentially free of nucleant surfactant at the time of kick off of the polymerization reaction.

In the practice of Aspect A, preferably, the total amount of hydrocarbon-containing stabilizing surfactant added to the aqueous medium is 3000 ppm and greater than 3000 ppm, more preferably 3500 ppm and greater than 3500 ppm, and most preferably 4000 ppm and greater than 4000 ppm, based on the total weight of PTFE present as dispersed particles, whether solids content is at least 45 wt %, at least 50 wt % or at least 55 wt %. As the solids content is increased above 45 wt %, so does the preferred total amount of hydrocarbon surfactant. The greater amount of stabilizing surfactant as compared to that which is needed to produce a solids content of 34 wt % PTFE involves two differences from the metering preferred for obtaining a dispersion of PTFE particles providing a solids content of 34 wt %: increase in the metering amount and increase in the duration of metering, preferably without sacrifice in STY. Instead an increase in STY is obtained, e.g. an increase by at least 10% (calculation: [100−(STY for 34 wt % solids content/STY for 60 wt %)]×100). The preferred metering rate of the stabilizing surfactant into the aqueous medium is from 0.7 g/l-hr to 1.4 g/l-hr as compared to the much smaller metering rates disclosed in earlier Examples for making PTFE in the present application. The maximum total amount of hydrocarbon-containing stabilizing surfactant is established by the high solids content desired along with the desired STY and minimized coagulum wt %. The maximum total amount should not penalize STY as described above and should produce a coagulum wt % 2 wt % or less than 2 wt %, more preferably, 1 wt % or less than 1 wt %. Generally, the total amount of hydrocarbon-containing surfactant added to the aqueous medium will be no greater than 5500 ppm, based on the weight of the dispersed particles of PTFE Aspect B of the embodiment of this Example can be described as follows: In a polymerization reactor, a dispersion of PTFE particles in an aqueous medium having a solids content of the particles in the aqueous medium of 45 wt % or greater than 45 wt %, wherein the dispersion is maintained stable within the aqueous medium by hydrocarbon-containing surfactant. By "maintained stable" is meant that without the presence of the hydrocarbon-containing stabilizing surfactant, the dispersion is unstable, i.e. the particles of PTFE coagulate within the reactor during the polymerization reaction. Coagulation during the polymerization reaction is exponential in the sense that once a small amount of coagulum is formed, e.g. 2 to 4 wt %, the formation of coagulum tends to increase thereafter at a more rapid rate to higher coagulum wt % s. It is this exponential increase in coagulum wt % that has generally limited polymerizations to less than 40 wt % solids contents for PTFE aqueous dispersions. If any other surfactant is present in the aqueous dispersion, such other surfactant does not stabilize the dispersion of PTFE particles. The dispersion is stable during the stirring accompanying the polymerization reaction and after the stirring has stopped upon completion of the reaction, resulting in the low coagulum wt % s described above in this Example and the ability to remove the dispersion from the reactor and store it without detriment to the dispersion.

Aspect C of the embodiment of this Example can be described as follows: A dispersion of PTFE particles in an aqueous medium having a solids content of the particles in the aqueous medium of at least 45 wt %, wherein the dispersion is maintained stable as described above within the aqueous medium by hydrocarbon-containing surfactant.

In Aspects A, B, and C, the preferred hydrocarbon-containing stabilizing surfactant is anionic hydrocarbon surfactant, e.g. any of those disclosed above. In Aspects A, B and C, the preferred amounts of surfactant, preferably ionic surfactant added to or present in the aqueous medium is 3000 ppm or greater than 3000 ppm, more preferably 3500 ppm or greater than 3500 ppm, and most preferably 4000 ppm or greater than 4000 ppm, based on the total weight of PTFE present as dispersed particles, whether solids content is at least 45 wt %, at least 50 wt % or at least 55 wt %. These amounts also apply to the preferred anionic surfactant R-L-M described, especially $CH_3-(CH_2)_n$-L-M wherein n, L, and M are described above, and most especially to sodium dodecyl sulfate (SDS). In Aspects B and C, the aqueous medium is essentially free of hydrocarbon-containing surfactant other than the hydrocarbon-containing surfactant that stabilizes the high solids content dispersion of PTFE particles. In the practice of Aspects A and B, any hydrocarbon-containing surfactant added to the aqueous medium before the kicking off of the polymerization of the fluoromonomer is oxidatively degraded to oleophilic nucleation sites prior to polymerization kickoff. In Aspect B, the aqueous medium upon completion of the polymerization is also preferably essentially free of halogen-containing surfactant, most preferably free of halogen-containing surfactant, such as fluorosurfactant in each case. This also applies to the aqueous dispersion of PTFE particles of Aspect C. The aqueous dispersion of Aspect C is also preferably as-polymerized. In Aspects A and B, the hydrocarbon-containing surfactant is essentially the only surfactant maintaining the stability of the high solids content PTFE particle dispersion in the aqueous medium, preferably as polymerized.

Illustrative of the practice of the embodiment of this Example is the following experiment.

To a 12 liter, horizontally disposed, jacketed, stainless steel reactor with a two blade agitator is added 3100 gm of deionized, deaerated water and 250 gm of liquid wax. To the reactor is added an additional 500 gm of deionized, deaerated water which contains 0.120 gm of Pluronic® 31R1 and 0.07 gm of Tergitol® TMN-6. The reactor is sealed and placed under vacuum. The reactor pressure is raised to 30 psig (310 kPa) with nitrogen and vented to atmospheric pressure. The reactor is pressured with nitrogen and vented 2 more times. The agitator speed is set to 65 RPM and the reactor is heated to 90° C. 160 ml of initiator solution containing 2.0 gm of ammonium persulfate (APS) per liter of water is added to the reactor. 948 gm of TFE is charged to the reactor to bring the reactor pressure to 400 psig (2.86 MPa). At time zero, 150 ml of an initiator solution composed of 14.58 gm of disuccinic acid peroxide, 0.18 gm of ammonium persulfate and 485.2 gm of deionized water is precharged to the reactor at 80 ml/min. After 2.6 minutes from the start of initiator injection the reactor pressure drops 10 psi (69 kPa) from the maximum pressure observed during injection of the initiator solution. Reactor pressure is brought back to 400 psig (2.86 MPa) with TFE and maintained at that pressure for the duration of the polymerization. After 100 gm of TFE has been fed since kickoff, corresponding to a 1.66 wt % concentration of PTFE in the aqueous medium, surfactant solution containing 7.0 gm of SDS as the hydrocarbon stabilizing surfactant and 0.043 gm of iron sulfate heptahydrate per 100 gm of water is pumped to the reactor at a rate of 3 ml/min (1.05 gm/I-hr of SDS) until the end of the run. After 153 minutes since kickoff, 6500 gm of TFE and 444 ml of surfactant solution has been added to the reactor. The agitator is stopped, the reactor is vented to atmospheric pressure and the dispersion is discharged. Upon cooling, liquid wax is separated from the dispersion and the dispersion is filtered to remove undispersed solids. The reactor is opened and all adhered polymer removed from the reactor. Reactor cleanout is combined with the filtered solids and dried in a vacuum oven. To get a measure of coagulum (total undispersed solids) liquid wax adhering to this polymer is further removed by centrifuging the polymer. Total coagulum is thus determined to be 29.1 gm. 6461 gm of dispersed PTFE particles, providing a solids content in the aqueous medium of 59.1% and an average particle size by volume, Dv(50), of 233 nm. The total amount of SDS added to the aqueous medium is 4810 ppm based on the weight of the PTFE particles of the dispersion. STY is 208.8 g/l-hr. The dispersion of PTFE particles is coagulated by diluting the dispersion to about 10 wt % solids and adding aqueous ammonium carbonate solution followed by vigorous agitation until the polymer fully separates from the water. The PTFE is dried in a vacuum oven at 110° C. for 12 hours. Melting point of the PTFE as measured by DSC on first heat is 337.8° C. This experiment is G-16 in Table G below.

A large number of polymerizations are carried out essentially following the above polymerization procedure, but varying the total amount of hydrocarbon surfactant to the aqueous medium, with the results obtained being reported in Table G below.

TABLE G

| Exp | Total Surf. ppm | % Solids | Dv(50) | Total Dispersed PTFE gm | Coagulum wt % | STY gm/l-hr |
|---|---|---|---|---|---|---|
| Control | 724 | 33.9 | 224 | 3267 | 2.3 | 148 |
| G-1 | 1321 | 47.6 | 245 | 4543 | 5.8 | 189 |
| G-2 | 1777 | 49.0 | 248 | 5022 | 5.6 | 201 |
| G-3 | 1905 | 50.4 | 225 | 5512 | 6.3 | 148 |
| G-4 | 2406 | 53.0 | 232 | 5610 | 4.4 | 156 |
| G-5 | 2669 | 53.1 | 237 | 5621 | 3.6 | 161 |
| G-6 | 2943 | 52.1 | 230 | 5607 | 3.3 | 166 |
| G-7 | 3012 | 53.7 | 233 | 6025 | 2.0 | 176 |
| G-8 | 3081 | 53.3 | 234 | 5842 | 1.8 | 136 |
| G-9 | 3126 | 52.4 | 231 | 5806 | 1.1 | 156 |
| G-10 | 3881 | 54.3 | 223 | 6262 | 0.7 | 174 |
| G-11 | 4038 | 54.6 | 247 | 6129 | 0.8 | 128 |
| G-12 | 4149 | 59.3 | 240 | 6869 | 1.1 | 182 |
| G-13 | 4273 | 57.7 | 238 | 6670 | 0.7 | 175 |
| G-14 | 4475 | 55.1 | 236 | 6369 | 0.6 | 189 |
| G-15 | 4479 | 56.9 | 232 | 6357 | 0.7 | 208 |
| G-16 | 4810 | 59.1 | 233 | 6461 | 0.4 | 209 |
| G-17 | 4653 | 60.4 | 242 | 6770 | 0.6 | 208 |

In Table G, the surfactant is SDS, the control is polymerization using 724 ppm of SDS to obtain a solids content of 33.9 wt %. Ppm of Surfactant is based on the total dispersed PTFE produced.

The results in Table G show that as the total amount of SDS (Total Surf ppm) increases above 724 ppm, the coagulum wt % increases sharply up to about 2000 ppm SDS, followed by a decline through the 2000-3000 ppm SDS range, wherein the coagulum wt % is higher than desired for high % solids dispersions. For example, the coagulum wt % for G-5 corresponds to 211 gm of coagulum, as compared to 77 gm of coagulum for the Control experiment. Within the 3000-4000 ppm SDS range, the wt % coagulum undergoes a transition, essentially from coagulum wt % of 2.0 wt % to less than 1.0 wt %. At 3012 ppm of total SDS added to the aqueous medium (G-7), the % coagulum is 2.0 wt %, while at 3881 ppm of total SDS added to the aqueous medium, the coagulum wt % is only 0.7 wt %. At total SDS amounts of at least 4000 ppm based on the total dispersed PTFE, the coagulum wt % s are consistently low, 6 out of 7 being less than 1.0 coagulum wt %. Experiment G-16 shows that a 59% solids content dispersion can have a coagulum wt % of considerably less than 1. The same is true for the 60.4 wt % solids of Experiment G-17. Experiments G-1 through G-6, producing undesirable coagulum wt % s at the high solids indicated, can be improved upon in this regard, by for example repeating the polymerization such as G-10, but stopping (completing) the polymerization at a lower solids content, such as 45 wt % or 50 wt %. The coagulum wt % of 0.7 for G-10 will be no higher when the polymerization is stopped upon reaching such lower solids content.

All of the PTFE polymers produced in these runs are high molecular weight, non melt flowable polymers, having a DSC first heat melting temperature of at least 336° C.

Example 11

This Example provides the preparation of TFE/VF$_2$ fluoroplastic.

To a 12 liter, horizontally disposed, jacketed, stainless steel reactor with a two blade agitator is added 6000 gm of deionized, deaerated water. To the reactor is added an additional 500 gm of deionized, deaerated water which contains 0.2 gm of Pluronic® 31R1. The reactor is sealed and placed under vacuum. The reactor pressure is raised to 30 psig (310 kPa) with nitrogen and evacuated three times. Agitation is begun and the agitator speed is set to 65 RPM. 0.5 gm of ethane is added to the reactor and the reactor is heated to 80° C. 30 ml of initiator solution containing 6.2 gm ammonium persulfate per liter of water is added to the reactor before precharging with monomers. A monomer mixture of 61 wt % TFE and 39 wt % VF$_2$ is charged to the reactor to bring the reactor to an operating pressure of 350 psig (2.51 MPa). When at operating pressure, 75 ml of initiator solution is charged to the reactor at 25 ml/min and then the pump rate is reset to 0.5 ml/min for the duration of the polymerization run. Kickoff occurs after 7 minutes from the start of initiator injection when the reactor pressure drops 10 psi (69 kPa) from the maximum pressure observed during injection of the initiator solution. Reactor pressure is controlled at 350 psig (2.51 MPa) with addition of a monomer mixture containing 55 wt % TFE and 45 wt % VF$_2$. After 500 gm of monomer has been fed since kickoff, corresponding to 7.02 wt % of TFE/VF$_2$ copolymer in the aqueous medium, a surfactant solution is pumped to the reactor at a rate of 0.2 ml/min until the end of the run. The surfactant solution is composed of 14.39 gm of sodium dodecyl sulfate per liter of solution which has been adjusted to a pH of 2.27 by the addition of sulfuric acid. The metering rate of the SDS is 0.0144 g/l-hr. After 99 minutes since kickoff, 1500 gm of monomer mixture and 13 ml of surfactant solution has been added to the reactor. The agitator is stopped, the reactor is vented to atmospheric pressure and the fluoropolymer dispersion is discharged. 7.43 kg of dispersion is produced with 16.1 wt % solids content and 212 nm raw dispersion particle size. Coagulum obtained from cleaning the reactor is dried in a vacuum oven and measures 46.6 gm. Polymer is isolated by freezing a dispersion sample followed by thawing, filtration, washing and drying. The polymer has a melting point as measured by Differential Scanning calorimeter of 175.4° C. and a heat of fusion of 34 Joules/gm, both indicating that the polymer is fluoroplastic, not a fluoroelastomer The copolymer has a very high molecular weight as indicated by difficulty in compression molding the copolymer into a film, i.e. the copolymer has a high melt viscosity characteristic of perfluoroplastics. The compression-molded film is dimensionally stable (not deformable like a fluoroelastomer) and is flexible.

What is claimed is:

1. A process for polymerizing fluoromonomer to form a dispersion of fluoropolymer particles in an aqueous medium in a polymerization reactor comprising an initial period and a stabilization period subsequent to the initial period, wherein the initial period comprises:
    preparing an initial dispersion of fluoropolymer particles in the aqueous medium in the polymerization reactor, and
    the stabilization period comprises:
        polymerizing fluoromonomer in the polymerization reactor, and
        adding hydrocarbon-containing surfactant to the polymerization reactor,
    wherein during the stabilization period no fluorosurfactant is added; and
    wherein a solids content of dispersed fluoropolymer particles of at least 16 wt % is achieved in the polymerization reactor by the process.

2. The process according to claim 1 wherein the initial dispersion of fluoropolymer particles is essentially free of fluorosurfactant.

3. The process according to claim 1 wherein the hydrocarbon-containing surfactant is metered into the polymerization reactor during the stabilization period.

4. The process according to claim 3 wherein the hydrocarbon-containing surfactant is metered at a rate sufficient to reduce the telogenic activity of said hydrocarbon-containing surfactant.

5. The process according to claim 4 wherein the hydrocarbon-containing surfactant is metered at a rate sufficient to reduce the telogenic activity of said hydrocarbon-containing surfactant and while maintaining surface activity to stabilize the dispersion of fluoropolymer particles in the medium during the polymerizing.

6. The process according to claim 1 wherein the hydrocarbon-containing surfactant is anionic.

7. The process according to claim 1 wherein said hydrocarbon-containing surfactant is hydrocarbon surfactant.

8. The process according to claim 1 wherein the hydrocarbon-containing surfactant is a compound of the formula R-L-M wherein R is an alkyl group containing from 6 to 17 carbon atoms, L is selected from the group consisting of —ArSO$_3^-$, —SO$_3^-$, —SO$_4^{2-}$, —PO$_3^-$ and —COO$^-$, wherein Ar is an aryl group, and M is a univalent cation selected from the group consisting of H$^+$, Na$^+$, K$^+$ and NH$_4^+$.

9. The process according to claim 1 wherein said polymerizing is carried out in the presence of polymerization initiator.

10. The process according to claim 1 which further comprises passivating said hydrocarbon-containing surfactant.

11. The process according to claim 10 wherein the hydrocarbon-containing surfactant is passivated by reacting the hydrocarbon-containing surfactant with an oxidizing agent.

12. The process according to claim 11 wherein the oxidizing agent is hydrogen peroxide or polymerization initiator.

13. The process according to claim 10, wherein the passivation of the hydrocarbon-containing surfactant is carried out in the presence of a passivation adjuvant.

14. The process according to claim 13 wherein the passivation adjuvant is a metal in the form of metal ion.

15. The process according to claim 14 wherein the metal ion is ferrous ion or cuprous ion.

16. The process according to claim 1 wherein the fluoromonomer is selected from tetrafluoroethylene (TFE), hexafluoropropylene (HFP), perfluoro-2,2-dimethyl-1,3-dioxole (PDD), perfluoro-2-methylene-4-methyl-1,3-dioxolane (PMD), perfluoro(alkyl vinyl ether) (PAVE) and mixtures thereof.

17. The process according to claim 1 wherein the initial period of the polymerization process comprises providing polymerization sites in the aqueous medium.

18. The process according to claim 1 wherein the polymerization sites are provided by a dispersed particulate of fluorinated ionomer.

19. The process according to claim 1 wherein fluoropolymer in the dispersion of fluoropolymer particles is selected from the group consisting of PTFE, modified PTFE, and copolymer comprising tetrafluoroethylene units and at least one other monomer.

20. A dispersion of fluoropolymer particles obtained from the process of claim 1.

21. The process of claim 1 wherein the solids content of dispersed fluoropolymer particles is at least 20 wt %.

22. The process of claim 1 wherein the solids content of dispersed fluoropolymer particles is at least 33 wt %.

23. The process of claim 1 wherein the solids content of dispersed fluoropolymer particles is at least 45 wt %.

24. The process of claim 1 wherein the solids content of dispersed fluoropolymer particles is at least 50 wt %.

25. The process of claim 1 wherein the solids content of dispersed fluoropolymer particles is at least 60 wt %.

26. The process of claim 1 wherein the process forms no greater than 5 wt % of the fluoropolymer as coagulum.

* * * * *